(12) United States Patent
Nakagawa et al.

(10) Patent No.: US 12,531,543 B2
(45) Date of Patent: Jan. 20, 2026

(54) HIGH FREQUENCY MODULE AND COMMUNICATION APPARATUS

(71) Applicant: Murata Manufacturing Co., Ltd., Kyoto (JP)

(72) Inventors: Dai Nakagawa, Kyoto (JP); Takanori Uejima, Kyoto (JP); Yuji Takematsu, Kyoto (JP); Naoya Matsumoto, Kyoto (JP); Ryohei Okabe, Kyoto (JP); Hiromichi Kitajima, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 746 days.

(21) Appl. No.: 18/047,295

(22) Filed: Oct. 18, 2022

(65) Prior Publication Data

US 2023/0066774 A1    Mar. 2, 2023

Related U.S. Application Data

(63) Continuation of application No. PCT/JP2021/006890, filed on Feb. 24, 2021.

(30) Foreign Application Priority Data

Apr. 24, 2020 (JP) ................................. 2020-077820

(51) Int. Cl.
*H03H 9/25* (2006.01)
*H03H 9/64* (2006.01)
*H04B 1/38* (2015.01)

(52) U.S. Cl.
CPC ............ *H03H 9/25* (2013.01); *H03H 9/6489* (2013.01); *H04B 1/38* (2013.01)

(58) Field of Classification Search
CPC ................................ H03H 9/25; H03H 9/6489
See application file for complete search history.

(56) References Cited

U.S. PATENT DOCUMENTS

| 5,789,820 A | 8/1998 | Yamashita | |
|---|---|---|---|
| 2005/0139981 A1* | 6/2005 | Kobayashi | .......... H01L 23/5227 257/E23.021 |

(Continued)

FOREIGN PATENT DOCUMENTS

| JP | H06-151960 A | 5/1994 |
|---|---|---|
| JP | H09-237807 A | 9/1997 |

(Continued)

OTHER PUBLICATIONS

International Search Report for PCT/JP2021/006890 dated May 25, 2021.

*Primary Examiner* — David Bilodeau
(74) *Attorney, Agent, or Firm* — McDonald Hopkins LLC

(57) ABSTRACT

Heat dissipating characteristics of an acoustic wave filter is improved. A high frequency module includes a mounting substrate, an acoustic wave filter, a resin layer, and a shield layer. The mounting substrate has a first main surface and a second main surface that face each other. The acoustic wave filter is arranged near the first main surface of the mounting substrate. The resin layer is arranged on the first main surface of the mounting substrate and covers an outer peripheral surface of the acoustic wave filter. The shield layer covers the resin layer and the acoustic wave filter. The shield layer is in contact with a second main surface of the acoustic wave filter that is far from the mounting substrate.

18 Claims, 20 Drawing Sheets

(56) References Cited

U.S. PATENT DOCUMENTS

| | | | |
|---|---|---|---|
| 2005/0212106 A1* | 9/2005 | Kwon | H01L 23/66 |
| | | | 257/E25.031 |
| 2007/0007558 A1 | 1/2007 | Mazzochette | |
| 2017/0250669 A1* | 8/2017 | Kuroyanagi | H03H 9/02574 |
| 2018/0166387 A1* | 6/2018 | Matsui | H01L 23/535 |
| 2018/0351595 A1* | 12/2018 | Tarui | H04B 1/38 |
| 2020/0106416 A1 | 4/2020 | Iwamoto | |
| 2020/0203291 A1* | 6/2020 | Uejima | H01L 25/16 |
| 2020/0365771 A1 | 11/2020 | Hiroki et al. | |
| 2020/0381336 A1 | 12/2020 | Otsubo et al. | |
| 2020/0395262 A1* | 12/2020 | Nomura | H01L 23/552 |
| 2021/0005579 A1* | 1/2021 | Matsumoto | H04B 1/40 |
| 2021/0099191 A1 | 4/2021 | Uejima | |
| 2023/0006708 A1* | 1/2023 | Nakagawa | H04B 1/38 |
| 2023/0017570 A1* | 1/2023 | Nakajima | H03F 3/195 |

FOREIGN PATENT DOCUMENTS

| | | |
|---|---|---|
| JP | H09-293810 A | 11/1997 |
| JP | H10-125830 A | 5/1998 |
| JP | 2006-156482 A | 6/2006 |
| JP | 2009-502024 A | 1/2009 |
| WO | 2018/084143 A1 | 5/2018 |
| WO | 2018/235433 A1 | 12/2018 |
| WO | 2019/092529 A1 | 5/2019 |
| WO | 2019/150825 A1 | 8/2019 |
| WO | 2019/167908 A1 | 9/2019 |
| WO | 2019/181590 A1 | 9/2019 |
| WO | 2019/244816 A1 | 12/2019 |

* cited by examiner

HIGH FREQUENCY MODULE AND COMMUNICATION APPARATUS

CROSS REFERENCE TO RELATED APPLICATION

This is a continuation of International Application No. PCT/JP2021/006890 filed on Feb. 24, 2021 which claims priority from Japanese Patent Application No. 2020-077820 filed on Apr. 24, 2020. The contents of these applications are incorporated herein by reference in their entireties.

BACKGROUND ART

Technical Field

The present disclosure relates in general to high frequency modules and communication apparatuses and more particularly to a high frequency module including an acoustic wave filter and a communication apparatus including a high frequency module.

In Patent Document 1, a high frequency module that includes a mounting substrate having a first main surface and a second main surface that face each other, a transmission power amplifier mounted on the first main surface of the mounting substrate, a resin member covering the transmission power amplifier, and a shield electrode layer is disclosed.

In the high frequency module disclosed in Patent Document 1, the shield electrode layer is formed to cover the top surface and side surfaces of the resin member.

Furthermore, in Patent Document 1, a communication apparatus including a high frequency module is disclosed.

Patent Document 1: International Publication No. 2019/181590

BRIEF SUMMARY

There may be a demand for improvement of heat dissipating characteristics of a high frequency module so that an increase of temperature of an electronic component (acoustic wave filter) can be reduced.

The present disclosure provides a high frequency module and a communication apparatus that are capable of improving heat dissipating characteristics of an acoustic wave filter.

A high frequency module according to an aspect of the present disclosure includes a mounting substrate, an acoustic wave filter, a resin layer, and a shield layer. The mounting substrate has a first main surface and a second main surface that face each other. The acoustic wave filter is arranged near the first main surface of the mounting substrate. The resin layer is arranged on the first main surface of the mounting substrate and covers an outer peripheral surface of the acoustic wave filter. The shield layer covers the resin layer and the acoustic wave filter. The shield layer is in contact with a main surface of the acoustic wave filter that is far from the mounting substrate.

A communication apparatus according to an aspect of the present disclosure includes the high frequency module mentioned above and a signal processing circuit. The signal processing circuit is connected to the high frequency module and performs signal processing for a high frequency signal.

A high frequency module and a communication apparatus according to an aspect of the present disclosure are capable of improving heat dissipating characteristics of an acoustic wave filter.

DETAILED DESCRIPTION

Figure 1:
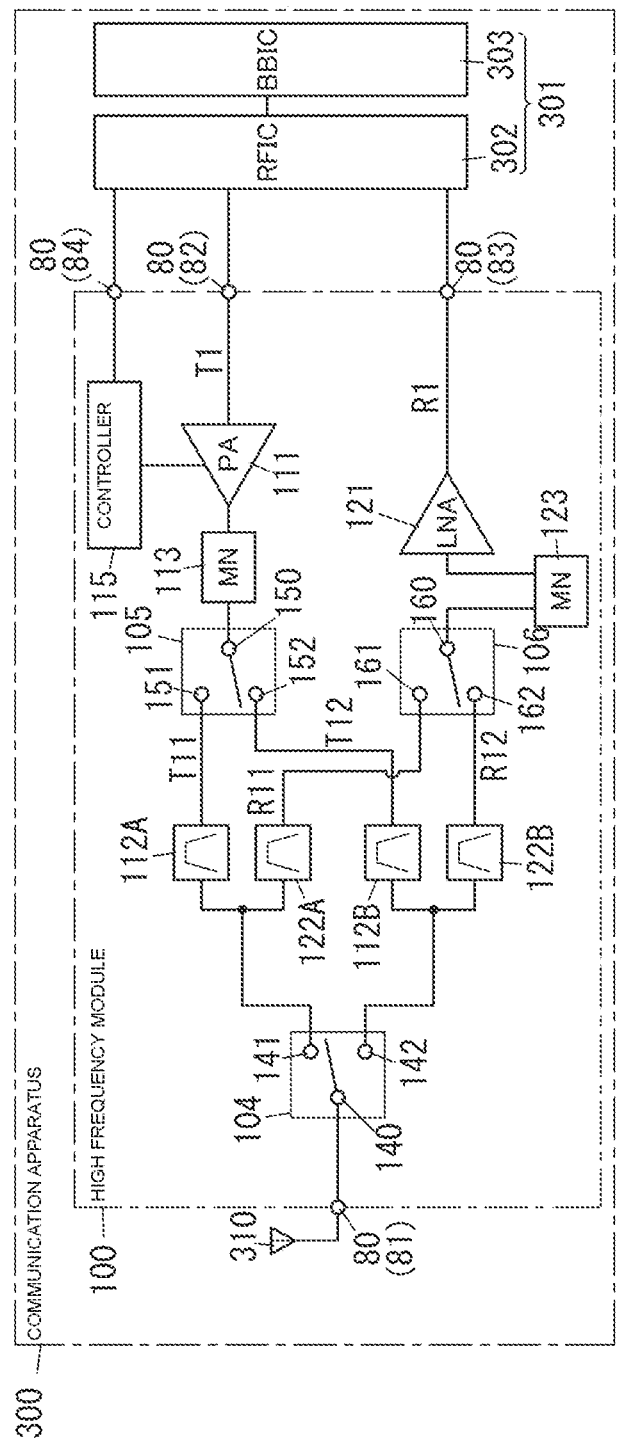
FIG. 1 is a circuit configuration diagram of a communication apparatus including a high frequency module according to a first embodiment.

FIGS. 2 to 21, FIG. 23, and FIG. 24, which will be referenced to in embodiments and the like described below, are schematic diagrams. The size ratio and thickness ratio of component elements in the drawings do not necessarily reflect the real dimension ratios.

(First Embodiment)

Figure 2:
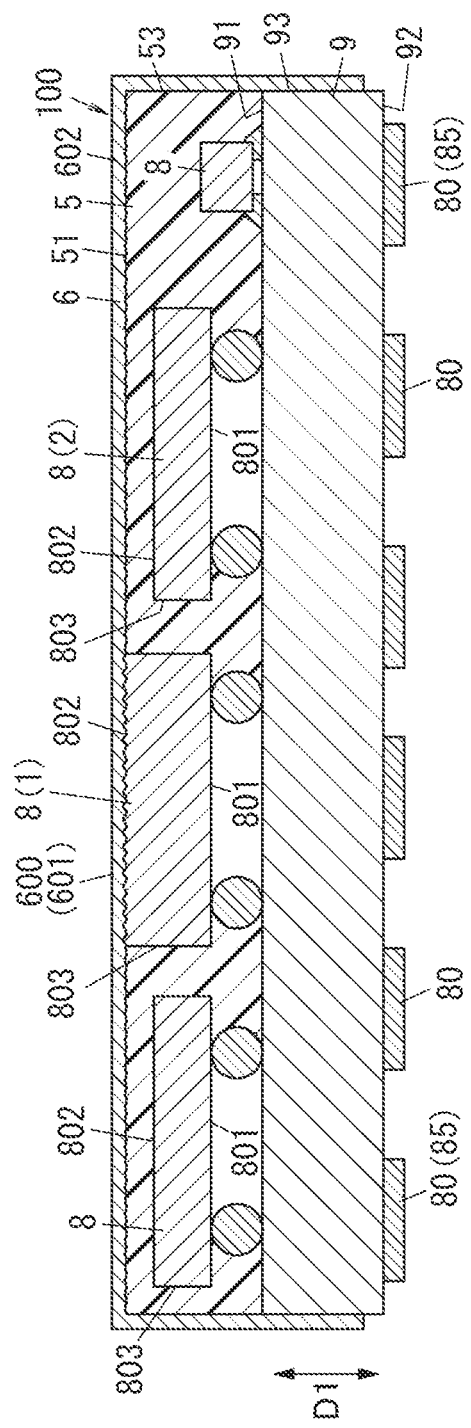
FIG. 2 is a cross-section view of the high frequency module.

A high frequency module 100 according to a first embodiment includes, as illustrated in FIG. 2, a mounting substrate 9, an acoustic wave filter 1, a resin layer 5, and a shield layer 6. The mounting substrate 9 has a first main surface 91 and a second main surface 92 that face each other. The acoustic wave filter 1 is arranged near the first main surface 91 of the mounting substrate 9. The resin layer 5 is arranged on the first main surface 91 of the mounting substrate 9 and covers an outer peripheral surface 803 of the acoustic wave filter 1. The shield layer 6 covers the resin layer 5 and the acoustic wave filter 1. The shield layer 6 is in contact with a main surface (second main surface 802) of the acoustic wave filter 1 that is far from the mounting substrate 9. Thus, the high frequency module 100 according to the first embodiment can improve heat dissipating characteristics of the acoustic wave filter 1. "Being arranged near a first main surface" herein includes a state in which the acoustic wave filter 1 is arranged on the first main surface 91 of the mounting substrate 9 and a state in which the acoustic wave filter 1 is arranged (stacked) on a main surface of a second electronic component, which is arranged on the first main surface 91 of the mounting substrate 9, the main surface of the second electronic component being far from the mounting substrate 9.

The high frequency module 100 and a communication apparatus 300 according to the first embodiment will be described below with reference to FIGS. 1 to 9.

(1) High Frequency Module and Communication Apparatus
(1.1) Circuit Configuration of High Frequency Module and Communication Apparatus A circuit configuration of the high frequency module 100 and the communication apparatus 300 according to the first embodiment will be described with reference to FIG. 1.

For example, the high frequency module 100 according to the first embodiment is used for the communication apparatus 300. The communication apparatus 300 is, for example, a mobile phone (for example, a smartphone). However, the communication apparatus 300 is not necessarily a mobile phone and may be, for example, a wearable terminal (for example, a smartwatch). The high frequency module 100 is, for example, a module supporting 4G (fourth-generation mobile communication) standards and 5G (fifth-generation mobile communication) standards. The 4G standards are, for example, 3GPP (Third Generation Partnership Project) LTE (Long Term Evolution) standards. The 5G standards are, for example, 5G NR (New Radio). The high frequency module 100 is a module supporting carrier aggregation and dual connectivity.

For example, the high frequency module 100 is configured to be capable of amplifying a transmission signal (high frequency signal) input from a signal processing circuit 301 and outputting the amplified transmission signal to an antenna 310. Furthermore, the high frequency module 100 is configured to be capable of amplifying a reception signal (high frequency signal) input from the antenna 310 and outputting the amplified reception signal to the signal processing circuit 301. The signal processing circuit 301 is not a component element of the high frequency module 100 but is a component element of the communication apparatus 300 including the high frequency module 100. For example, the high frequency module 100 is controlled by the signal processing circuit 301 provided in the communication apparatus 300. The communication apparatus 300 includes the high frequency module 100 and the signal processing circuit 301. The communication apparatus 300 further includes the antenna 310. The communication apparatus 300 further includes a circuit substrate on which the high frequency module 100 is mounted. The circuit substrate is, for example, a printed wiring board. The circuit substrate includes a ground electrode to which a ground potential is applied.

The signal processing circuit 301 includes, for example, an RF signal processing circuit 302 and a baseband signal processing circuit 303. The RF signal processing circuit 302 is, for example, an RFIC (Radio Frequency Integrated Circuit) and performs signal processing for a high frequency signal. For example, the RF signal processing circuit 302 performs signal processing such as up-conversion for a high frequency signal (transmission signal) output from the baseband signal processing circuit 303 and outputs the signal-processed high frequency signal. Furthermore, for example, the RF signal processing circuit 302 performs signal processing such as down-conversion for a high frequency signal (reception signal) output from the high frequency module 100 and outputs the signal-processed high frequency signal to the baseband signal processing circuit 303. The baseband signal processing circuit 303 is, for example, a BBIC (Baseband Integrated Circuit). The baseband signal processing circuit 303 generates an I-phase signal and a Q-phase signal from a baseband signal. A baseband signal is, for example, an audio signal, an image signal, or the like input from the outside. The baseband signal processing circuit 303 mixes an I-phase signal with a Q-phase signal to perform IQ modulation processing and outputs a transmission signal. At this time, the transmission signal is generated as a modulation signal (IQ signal) obtained by amplitude-modulating a carrier signal of a predetermined frequency at a period longer than the period of the carrier signal. For example, a reception signal processed at the baseband signal processing circuit 303 is used as an image signal for image display or an audio signal for conversation. The high frequency module 100 transmits high frequency signals (reception signal and transmission signal) to and from each of the antenna 310 and the RF signal processing circuit 302 of the signal processing circuit 301.

The high frequency module 100 includes a power amplifier 111 and a low noise amplifier 121. The high frequency module 100 also includes a plurality of (in the example in the drawing, two) transmission filters 112A and 112B and a plurality of (in the example in the drawing, two) reception filters 122A and 122B. The high frequency module 100 also includes an output matching circuit 113 and an input matching circuit 123. The high frequency module 100 also includes a first switch 104, a second switch 105, and a third switch 106. The high frequency module 100 also includes a controller 115. In the high frequency module 100 according to the first embodiment, the transmission filter 112A configures the acoustic wave filter 1 described above. In other words, the acoustic wave filter 1 is the transmission filter 112A that is provided on a signal path T1 for transmission signals.

Furthermore, the high frequency module 100 includes a plurality of external connection terminals 80. The plurality of external connection terminals 80 include an antenna terminal 81, a signal input terminal 82, a signal output terminal 83, and a plurality of ground terminals 85 (see FIG. 2). The plurality of ground terminals 85 are terminals that are electrically connected to the ground electrode on the circuit substrate described above provided in the communication apparatus 300 and the ground potential is thus applied to the plurality of ground terminals 85.

The power amplifier 111 is provided on the signal path T1 for transmission signals. The power amplifier 111 includes an input terminal and an output terminal. The power amplifier 111 amplifies a transmission signal of a first frequency range input to the input terminal and outputs the amplified transmission signal to the output terminal. For example, the first frequency range includes a first communication band and a second communication band. The first communication band corresponds to transmission signals passing through the transmission filter 112A and is, for example, Band 11 of 3GPP LTE standards. The second communication band corresponds to transmission signals passing through the transmission filter 112B and is, for example, Band 22 of 3GPP LTE standards.

The input terminal of the power amplifier 111 is connected to the signal input terminal 82. The input terminal of the power amplifier 111 is connected to the signal processing circuit 301 with the signal input terminal 82 interposed therebetween. The signal input terminal 82 is a terminal for allowing a high frequency signal (transmission signal) from an external circuit (for example, the signal processing circuit 301) to be input to the high frequency module 100. The output terminal of the power amplifier 111 is connected to a common terminal 150 of the second switch 105 with the output matching circuit 113 interposed therebetween. The power amplifier 111 is controlled by the controller 115.

The low noise amplifier 121 is provided on a signal path R1 for reception signals. The low noise amplifier 121 includes an input terminal and an output terminal. The low noise amplifier 121 amplifies a reception signal of a second frequency range input to the input terminal and outputs the amplified reception signal from the output terminal. For example, the second frequency range is the same as the first frequency range and includes a first communication band and a second communication band.

The input terminal of the low noise amplifier 121 is connected to a common terminal 160 of the third switch 106 with the input matching circuit 123 interposed therebetween. The output terminal of the low noise amplifier 121 is connected to the signal output terminal 83. For example, the output terminal of the low noise amplifier 121 is connected to the signal processing circuit 301 with the signal output terminal 83 interposed therebetween. The signal output terminal 83 is a terminal for allowing a high frequency signal (reception signal) from the low noise amplifier 121 to be output to an external circuit (for example, the signal processing circuit 301).

The transmission filter 112A is, for example, a filter that uses a transmission band of the first communication band as a pass band. The transmission filter 112B is, for example, a filter that uses a transmission band of the second communication band as a pass band.

The reception filter 122A is, for example, a filter that uses a reception band of the first communication band as a pass band. The reception filter 122B is, for example, a filter that uses a reception band of the second communication band as a pass band.

The first switch 104 includes a common terminal 140 and a plurality of (in the example in the drawing, two) selection terminals 141 and 142. The common terminal 140 is connected to the antenna terminal 81. The antenna 310 is connected to the antenna terminal 81. The selection terminal 141 is connected to a connection point between the output terminal of the transmission filter 112A and the input terminal of the reception filter 122A. The selection terminal 142 is connected to a connection point between the output terminal of the transmission filter 112B and the input terminal of the reception filter 122B. The first switch 104 is, for example, a switch capable of connecting at least one of the plurality of selection terminals 141 and 142 to the common terminal 140. The first switch 104 is, for example, a switch capable of one-to-one connection and one-to-many connection.

The first switch 104 is provided on both the signal path T1 (T11 and T12) for transmission signals and the signal path R1 (R11 and R12) for reception signals. More specifically, the first switch 104 is provided on the signal path T11 for transmission signals on which the power amplifier 111, the output matching circuit 113, the second switch 105, and the transmission filter 112A are provided. Furthermore, the first switch 104 is provided on the signal path T12 for transmission signals on which the power amplifier 111, the output matching circuit 113, the second switch 105, and the transmission filter 112B are provided. Furthermore, the first switch 104 is provided on the signal path R11 for reception signals on which the reception filter 122A, the third switch 106, the input matching circuit 123, and the low noise amplifier 121 are provided. Furthermore, the first switch 104 is provided on the signal path R12 for reception signals on which the reception filter 122B, the third switch 106, the input matching circuit 123, and the low noise amplifier 121 are provided.

For example, the first switch 104 is controlled by the signal processing circuit 301. The first switch 104 switches the state of connection between the common terminal 140 and each of the plurality of selection terminals 141 and 142 in accordance with a control signal from the RF signal processing circuit 302 of the signal processing circuit 301. The first switch 104 is, for example, a switch IC (Integrated Circuit).

The second switch 105 includes the common terminal 150 and a plurality of (in the example in the drawing, two) selection terminals 151 and 152. The common terminal 150 is connected to the output terminal of the power amplifier 111 with the output matching circuit 113 interposed therebetween. The selection terminal 151 is connected to the input terminal of the transmission filter 112A. The selection terminal 152 is connected to the input terminal of the transmission filter 112B. For example, the second switch 105 is a switch capable of connecting at least one of the plurality of selection terminals 151 and 152 to the common terminal 150. The second switch 105 is, for example, a switch capable of one-to-one connection and one-to-many connection. The second switch 105 is a switch having a function for switching between the signal paths T11 and T12 for transmission signals of different communication bands.

For example, the second switch 105 is controlled by the signal processing circuit 301. The second switch 105 switches the state of connection between the common terminal 150 and each of the plurality of selection terminals 151 and 152 in accordance with a control signal from the RF signal processing circuit 302 of the signal processing circuit 301. The second switch 105 is, for example, a switch IC.

The third switch 106 includes the common terminal 160 and a plurality of (in the example in the drawing, two) selection terminals 161 and 162. The common terminal 160 is connected to the input terminal of the low noise amplifier 121 with the input matching circuit 123 interposed therebetween. The selection terminal 161 is connected to the output terminal of the reception filter 122A. The selection terminal 162 is connected to the output terminal of the reception filter 122B. For example, the third switch 106 is a switch capable of connecting at least one of the plurality of selection terminals 161 and 162 to the common terminal 160. The third switch 106 is, for example, a switch capable of one-to-one connection and one-to-many connection. The third switch 106 is a switch having a function for switching between the signal paths R11 and R12 for reception signals of different communication bands.

For example, the third switch 106 is controlled by the signal processing circuit 301. The third switch 106 switches the state of connection between the common terminal 160 and each of the plurality of selection terminals 161 and 162 in accordance with a control from the RF signal processing circuit 302 of the signal processing circuit 301. The third switch 106 is, for example, a switch IC.

The output matching circuit 113 is provided on a signal path between the output terminal of the power amplifier 111 and the common terminal 150 of the second switch 105. The output matching circuit 113 is a circuit for achieving impedance matching between the power amplifier 111 and the transmission filters 112A and 112B. For example, the output matching circuit 113 is an inductor. However, the output matching circuit 113 is not limited to an inductor and may include, for example, a plurality of inductors and a plurality of capacitors.

The input matching circuit 123 is provided on a signal path between the input terminal of the low noise amplifier 121 and the common terminal 160 of the third switch 106. The input matching circuit 123 is a circuit for achieving impedance matching between the low noise amplifier 121 and the reception filters 122A and 122B. For example, the input matching circuit 123 is an inductor. However, the input matching circuit 123 is not limited to an inductor and may include, for example, a plurality of inductors and a plurality of capacitors.

The controller 115 is connected to the power amplifier 111. The controller 115 controls the power amplifier 111 in accordance with a control signal from the RF signal processing circuit 302 of the signal processing circuit 301.

(1.2) Structure of High Frequency Module

Next, a structure of the high frequency module 100 according to the first embodiment will be described with reference to FIGS. 2 to 4.

The high frequency module 100 according to the first embodiment includes, as illustrated in FIG. 2, the mounting substrate 9, a plurality of electronic components 8, and the plurality of external connection terminals 80. The plurality of electronic components 8 include the power amplifier 111, the low noise amplifier 121, the plurality of transmission filters 112A and 112B, the plurality of reception filters 122A and 122B, the output matching circuit 113, and the input matching circuit 123 described above. The plurality of electronic components 8 also include the first switch 104, the second switch 105, and the third switch 106 described above. That is, the plurality of electronic components 8 include a first electronic component 1 and a second electronic component 2. The first electronic component 1 is, for example, the transmission filter 112A. The second electronic component 2 is, for example, the reception filter 122A.

The mounting substrate 9 has the first main surface 91 and the second main surface 92 that face each other in a thickness direction D1 of the mounting substrate 9. The mounting substrate 9 is, for example, a multilayer substrate including a plurality of dielectric layers and a plurality of conductive layers. The plurality of dielectric layers and the plurality of conductive layers are laminated in the thickness direction D1 of the mounting substrate 9. The plurality of conductive layers are formed in specific patterns set for individual layers. Each of the plurality of conductive layers include one or more conductive parts in a plane orthogonal to the thickness direction D1 of the mounting substrate 9. Each of the conductive layers is made of, for example, copper. The plurality of conductive layers include a ground layer. In the high frequency module 100, the plurality of ground terminals 85 and the ground layer are electrically connected with via conductors or the like, which are provided in the mounting substrate 9, interposed therebetween. The mounting substrate 9 is, for example, an LTCC (Low Temperature Co-fired Ceramics) substrate. The mounting substrate 9 is not necessarily an LTCC substrate and may be, for example, a printed wiring board, an HTCC (High Temperature Co-fired Ceramics) substrate, or a resin multilayer substrate.

Furthermore, the mounting substrate 9 is not necessarily be an LTCC substrate and may be, for example, a wiring structure. The wiring structure is, for example, a multilayer structure. The multilayer structure includes at least one insulating layer and at least one conductive layer. The insulating layer is formed in a predetermined pattern. In the case where a plurality of insulating layers are provided, they are formed in predetermined patterns set for individual layers. The conductive layer is formed in a predetermined pattern different from the predetermined pattern of the insulating layer. In the case where a plurality of conductive layers are provided, they are formed in predetermined patterns set for individual layers. The conductive layer may include one or more rewiring parts. In the wiring structure, out of two faces that face each other in a thickness direction of the multilayer structure, a first surface of is the first main surface 91 of the mounting substrate 9 and a second surface is the second main surface 92 of the mounting substrate 9. The wiring structure may be, for example, an interposer. The interposer may be an interposer including a silicon substrate or a substrate including multiple layers.

The first main surface 91 and the second main surface 92 of the mounting substrate 9 are away from each other in the thickness direction D1 of the mounting substrate 9 and intersect with each other in the thickness direction D1 of the mounting substrate 9. For example, the first main surface 91 of the mounting substrate 9 is orthogonal to the thickness direction D1 of the mounting substrate 9. However, for example, the first main surface 91 may include, as a surface that is not orthogonal to the thickness direction D1, a side face of a conductive part or the like. Furthermore, for example, the second main surface 92 of the mounting substrate 9 is orthogonal to the thickness direction D1 of the mounting substrate 9. However, for example, the second main surface 92 may include, as a surface that is not orthogonal to the thickness direction D1, a side face of a conductive part or the like. Furthermore, fine roughness, recesses, or protrusions may be formed in the first main surface 91 and the second main surface 92 of the mounting substrate 9. The mounting substrate 9 has a rectangular shape when viewed in plan from the thickness direction D1 of the mounting substrate 9. However, the mounting substrate 9 does not necessarily have a rectangular shape and may have a square shape.

In the high frequency module 100 according to the first embodiment, the plurality of electronic components 8 are mounted on the first main surface 91 of the mounting substrate 9. "Being mounted" herein includes a state in which the electronic components 8 are arranged on (mechanically connected to) the first main surface 91 of the mounting substrate 9 and a state in which the electronic components 8 are electrically connected to (an appropriate conductive part of) the mounting substrate 9. Thus, in the high frequency module 100, the plurality of electronic components 8 are arranged on the first main surface 91 of the mounting substrate 9. Each of the plurality of electronic components 8 has a first main surface 801 and the second main surface 802 that face each other. Each of the plurality of electronic components 8 is arranged on the first main surface 91 of the mounting substrate 9 in such a manner that the first main surface 801 is near the first main surface 91 of the mounting substrate 9 in the thickness direction D1 of the mounting substrate 9. Thus, the second main surface 802 of the electronic component 8 is a main surface that is far from the mounting substrate 9 in the thickness direction D1 of the mounting substrate 9. Furthermore, each of the plurality of electronic components 8 includes an outer peripheral surface 803 that connects the first main surface 801 to the second main surface 802. The high frequency module 100 may include a circuit element provided in the mounting substrate 9 as well as the plurality of electronic components 8 mounted on the mounting substrate 9.

The power amplifier 111 is, for example, is an IC chip including a substrate having a first main surface and a second main surface that face each other and a circuit unit (IC unit) including a transistor formed near the first main surface of the substrate. The substrate is, for example, a gallium arsenide substrate. The circuit unit has a function for amplifying a transmission signal input to the input terminal of the power amplifier 111. The transistor is, for example, an HBT (Heterojunction Bipolar Transistor). The power amplifier 111 may include, for example, a DC cut capacitor. The IC chip including the power amplifier 111 is flip-chip mounted on the first main surface 91 of the mounting substrate 9 in such a manner that the first main surface, out of the first main surface and the second main surface, of the substrate is near the first main surface 91 of the mounting substrate 9. The outer peripheral shape of the IC chip including the power amplifier 111 when viewed in plan from the thickness direction D1 of the mounting substrate 9 is a quadrangular shape. The substrate of the IC chip including the power amplifier 111 is not necessarily a gallium arsenide substrate and may be a silicon substrate, a silicon germanium substrate, a gallium nitride substrate, or the like. Furthermore, the transistor is not necessarily a bipolar transistor such as an HBT and may be, for example, an FET (Field Effect Transistor). The FET is, for example, a MOSFET (Metal-Oxide-Semiconductor Field Effect Transistor).

The low noise amplifier 121 is, for example, an IC chip including a substrate having a first main surface and a second main surface that face each other and a circuit unit (IC unit) formed near the first main surface of the substrate. The substrate is, for example, a silicon substrate. The circuit unit has a function for amplifying a reception signal input to the input terminal of the low noise amplifier 121. The low noise amplifier 121 is flip-chip mounted on the first main surface 91 of the mounting substrate 9 in such a manner that the first main surface, out of the first main surface and the second main surface, of the substrate is near the first main surface 91 of the mounting substrate 9. The outer peripheral shape of the low noise amplifier 121 when viewed in plan from the thickness direction D1 of the mounting substrate 9 is a quadrangular shape.

Each of the plurality of transmission filters 112A and 112B and the plurality of reception filters 122A and 122B is, for example, a ladder filter and includes a plurality of (for example, four) series-arm resonators and a plurality of (for example, three) parallel-arm resonators. Each of the plurality of transmission filters 112A and 112B and the plurality of reception filters 122A and 122B is, for example, an acoustic wave filter. The acoustic wave filter is configured such that each of the plurality of series-arm resonators and the plurality of parallel-arm resonators is an acoustic wave resonator. The acoustic wave filter is, for example, a surface acoustic wave filter using surface acoustic waves. That is, in the high frequency module 100 according to the first embodiment, the transmission filter 112A, which is the first electronic component 1, is an acoustic wave filter (hereinafter, may also be referred to an "acoustic wave filter 1").

In the surface acoustic wave filter, each of the plurality of series-arm resonators and the plurality of parallel-arm resonators is, for example, a SAW (Surface Acoustic Wave) resonator.

The surface acoustic wave filter includes, for example, a substrate having a first main surface and a second main surface that face each other and a circuit unit formed near the first main surface of the substrate. The substrate is a piezoelectric substrate. The piezoelectric substrate is, for example, a lithium niobate substrate. The circuit unit includes a plurality of IDT (Interdigital Transducer) electrodes that are associated with the plurality of series-arm resonators in a one-to-one relationship and a plurality of IDT electrodes that are associated with the plurality of parallel-arm resonators in a one-to-one relationship.

Each of the plurality of transmission filters 112A and 112B and the plurality of reception filters 122A and 122B is, for example, a bare-chip acoustic wave filter. The outer peripheral shape of each of the plurality of transmission filters 112A and 112B and the plurality of reception filters 122A and 122B when viewed in plan from the thickness direction D1 of the mounting substrate 9 is a quadrangular shape. Each of the plurality of transmission filters 112A and 112B and the plurality of reception filters 122A and 122B is flip-chip mounted on the first main surface 91 of the mounting substrate 9 in such a manner that the first main surface, out of the first main surface and the second main surface, of the substrate is near the mounting substrate 9.

Each of the first switch 104, the second switch 105, and the third switch 106 is a switch IC. More specifically, each of the first switch 104, the second switch 105, and the third switch 106 is, for example, an IC chip that includes a substrate having a first main surface and a second main surface that face each other and a circuit unit (IC unit) including an FET (Field Effect Transistor) formed near the first main surface of the substrate. The substrate is, for example, a silicon substrate. The circuit unit is a functional unit having a function for switching the state of connection between a common terminal and each of a plurality of selection terminals. The outer peripheral shape of an IC chip configuring each of the first switch 104, the second switch 105, and the third switch 106 when viewed in plan from the thickness direction D1 of the mounting substrate 9 is a quadrangular shape. Each of the first switch 104, the second switch 105, and the third switch 106 is flip-chip mounted on the first main surface 91 of the mounting substrate 9 in such a manner that the first main surface, out of the first main surface and the second main surface, of the substrate is near the first main surface 91 of the mounting substrate 9.

An inductor of the output matching circuit 113 is, for example, a chip inductor. The inductor of the output matching circuit 113 is, for example, mounted on the first main surface 91 of the mounting substrate 9. However, the inductor of the output matching circuit 113 is not necessarily mounted on the first main surface 91 of the mounting substrate 9. The outer peripheral shape of the inductor when viewed in plan from the thickness direction D1 of the mounting substrate 9 is a quadrangular shape.

An inductor of the input matching circuit 123 is, for example, a chip inductor. The inductor of the input matching circuit 123 is, for example, mounted on the first main surface 91 of the mounting substrate 9. However, the inductor of the input matching circuit 123 is not necessarily mounted on the first main surface 91 of the mounting substrate 9. The outer peripheral shape of the inductor when viewed in plan from the thickness direction D1 of the mounting substrate 9 is a quadrangular shape.

The plurality of external connection terminals 80 are arranged on the second main surface 92 of the mounting substrate 9. The plurality of external connection terminals 80 are made of, for example, metal (such as copper, copper alloy, etc.).

The plurality of external connection terminals 80 include the plurality of ground terminals 85, in addition to the antenna terminal 81, the signal input terminal 82, and the signal output terminal 83 described above. The plurality of ground terminals 85 are electrically connected to the ground layer of the mounting substrate 9, as described above. The ground layer is a circuit ground of the high frequency module 100. The plurality of electronic components 8 include an electronic component 8 electrically connected to the ground layer.

The resin layer 5 covers, near the first main surface 91 of the mounting substrate 9, at least part of each of the plurality of electronic components 8 arranged on the first main surface 91 of the mounting substrate 9. The resin layer 5 includes resin. The resin layer 5 may also include a filler as well as resin. The resin layer 5 covers the outer peripheral surface 803 of each of the plurality of electronic components 8. Furthermore, the resin layer 5 also covers the second main surface 802 of part of the plurality of electronic components 8.

The shield layer 6 covers a main surface 51 of the resin layer 5 that is far from the mounting substrate 9, an outer peripheral surface 53 of the resin layer 5, and an outer peripheral surface 93 of the mounting substrate 9. The shield layer 6 is made of, for example, one or more types of metal. The material of the shield layer 6 includes, for example, silver. The shield layer 6 is in contact with the ground layer of the mounting substrate 9. This structure enables the potential of the shield layer 6 to be equal to the potential of the ground layer.

Figure 3:
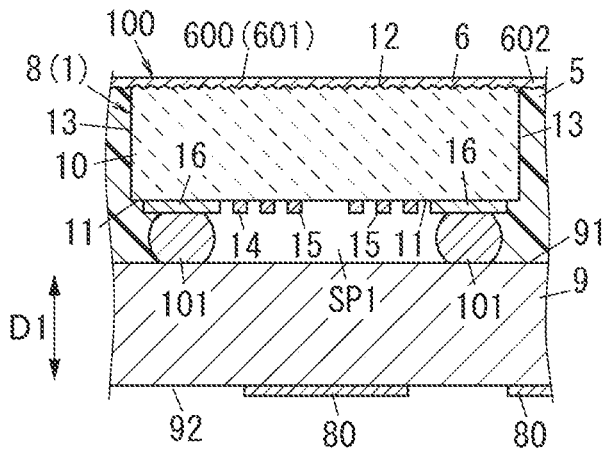
FIG. 3 is a cross-section view of an enlarged part of the high frequency module.

In the high frequency module 100 according to the first embodiment, as illustrated in FIG. 3, the first electronic component 1 includes a first substrate 10, a first circuit unit 14, and a plurality of first pad electrodes 16. The first circuit unit 14 includes a plurality of IDT electrodes 15. The plurality of first pad electrodes 16 are formed near a first main surface 11 of the first substrate 10 and connected to the first circuit unit 14. The high frequency module 100 further includes a plurality of first bumps 101 that are bonded to the plurality of first pad electrodes 16 and the mounting substrate 9. In the high frequency module 100, the plurality of IDT electrodes 15 of a bare-chip acoustic wave filter configuring the first electronic component 1 are arranged in a first space SP1 that is formed, between the first substrate 10 and the mounting substrate 9, by the plurality of first pad electrodes 16, the plurality of first bumps 101, the first substrate 10, the mounting substrate 9, and the resin layer 5.

In the high frequency module 100 according to the first embodiment, the thickness of a substrate configuring the first electronic component 1 and the thickness of a substrate configuring the second electronic component 2 are different from each other. Specifically, in the high frequency module 100 according to the first embodiment, the thickness of the substrate configuring the first electronic component 1 is larger than the thickness of the substrate configuring the second electronic component 2.

Regarding the first electronic component 1, in the case where a second main surface 12 of the first substrate 10 is rough, adhesiveness with the shield layer 6 can be improved compared to the case where the second main surface 12 of the first substrate 10 is not rough. Thus, in terms of improvement of adhesiveness with the shield layer 6, it is desirable that the second main surface 12 of the first substrate 10 be rough. In the high frequency module 100 according to the first embodiment, the second main surface 12 of the first substrate 10 is rougher (degree of surface roughness is higher) than the main surface (second main surface 802) of the electronic component 8, which is arranged on the first main surface 91 of the mounting substrate 9 and covered with the resin layer 5, the main surface being far from the mounting substrate 9. In this case, the maximum height roughness (Rz) of the second main surface 12 of the first substrate 10 is greater than the maximum height roughness of the second main surface 802 of the electronic component 8, the second main surface 802 of the electronic component 8 being covered with the resin layer 5. Regarding surface roughness, the maximum height roughness represents a measurement value obtained from a STEM (Scanning Transmission Electron Microscope) image by observing the cross-section of the high frequency module 100 using a STEM. The maximum height roughness represents the sum of the maximum value of a peak height and the maximum value of a valley depth of each of the second main surface 12 of the first substrate 10 and the second main surface 802 of the electronic component 8 in the STEM image. That is, the maximum height roughness of each of the second main surface 12 of the first substrate 10 and the second main surface 802 of the electronic component 8 represents a Peak to Valley value of roughness. For example, the surface roughness of the second main surface 12 of the first substrate 10 can be changed depending on a condition of processing for making the second main surface 12 of the first substrate 10 rough by grinding or the like at the time of manufacturing. When it comes to the relative magnitude relationship of surface roughness, a surface roughness is not necessarily a value obtained from a STEM image but may be a value obtained from, for example, a SEM (Scanning Electron Microscope) image.

Figure 4:
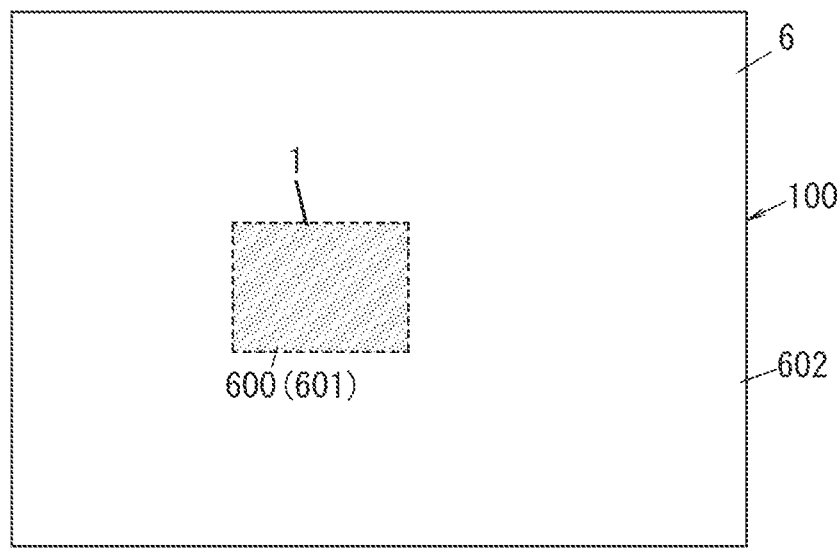
FIG. 4 is a plan view of the high frequency module.

Furthermore, in the high frequency module 100 according to the first embodiment, as illustrated in FIG. 4, the shield layer 6 includes an identification mark 600. The identification mark 600 includes a first part 601. The first part 601 is a part of the shield layer 6 that overlaps with the acoustic wave filter 1 in the thickness direction D1 of the mounting substrate 9. Hereinafter, a part of the shield layer 6 that does not overlap with the acoustic wave filter 1 in the thickness direction D1 of the mounting substrate 9 will be referred to as a second part 602. In the high frequency module 100 according to the first embodiment, for example, the degree of reflection of light incident to the first part 601 from the outside and the degree of reflection of light incident to the second part 602 from the outside are different. Thus, in the high frequency module 100 according to the first embodiment, the color of the first part 601 and the color of the second part 602 are different for human eyes. FIG. 4 is a plan view of the high frequency module 100. For easier understanding of distinction between the first part 601 and the second part 602, the first part 601 is hatched with dots. The main surface of the first part 601 that is far from the first substrate 10 may have recesses and protrusions that reflect recesses and protrusions in the second main surface 12 of the first substrate 10.

(2) Method for Manufacturing High Frequency Module

Next, a method for manufacturing the high frequency module 100 according to the first embodiment will be briefly explained.

A method for manufacturing the high frequency module 100 includes, for example, a first step, a second step, a third step, and a fourth step. The first step is a step for arranging the plurality of electronic components 8 including the first electronic component (acoustic wave filter) 1 on the first main surface 91 of the mounting substrate 9. The second step is a step for forming a resin material layer that the resin layer 5 will be made from and covers the plurality of electronic components 8, near the first main surface 91 of the mounting substrate 9. The third step is a step for grinding the resin material layer so that the first substrate 10 of the first electronic component 1 is exposed out of the main surface of the resin material layer that is far from the mounting substrate 9 and then grinding the resin material layer and the first substrate 10 to form the resin layer 5 and thin the first substrate 10. The fourth step is a step for forming the shield layer 6 that is to be in contact with the main surface 51 of the resin layer 5 and the second main surface 12 of the first substrate 10 by, for example, sputtering, deposition, printing, or the like.

(3) Summary (3.1) High Frequency Module

The high frequency module 100 according to the first embodiment includes the mounting substrate 9, the acoustic wave filter 1, the resin layer 5, and the shield layer 6. The mounting substrate 9 has the first main surface 91 and the second main surface 92 that face each other. The acoustic wave filter 1 is arranged near the first main surface 91 of the mounting substrate 9. The resin layer 5 is arranged on the first main surface 91 of the mounting substrate 9 and covers the outer peripheral surface 803 of the acoustic wave filter 1. The shield layer 6 covers the resin layer 5 and the acoustic wave filter 1. The shield layer 6 is in contact with the second main surface 802 of the acoustic wave filter 1 that is far from the mounting substrate 9.

In the high frequency module 100 according to the first embodiment, as described above, the second main surface 802 of the acoustic wave filter 1 is in contact with the shield layer 6. Thus, heat generated at the acoustic wave filter 1 can be transmitted to the shield layer 6. Therefore, an improvement of the heat dissipating characteristics of the acoustic wave filter 1 can be achieved. In the high frequency module 100 according to the first embodiment, in terms of improving the heat dissipating characteristics, it is desirable that the shield layer 6 be in contact with the entire second main surface 12 of the first substrate 10. However, the shield layer 6 is not necessarily in contact with the entire second main surface 12 of the first substrate 10.

Furthermore, in the high frequency module 100 according to the first embodiment, heat generated at the acoustic wave filter 1 can be dissipated through the second main surface 12 of the first substrate 10 and the shield layer 6. Thus, in the high frequency module 100 according to the first embodiment, an increase of temperature of a lithium niobate substrate configuring the first substrate 10 can be reduced. Therefore, in the high frequency module 100 according to the first embodiment, stable temperature characteristics of the acoustic wave filter 1 can be achieved, and stable characteristics of the high frequency module 100 can be achieved.

Furthermore, in the high frequency module 100 according to the first embodiment, the second main surface 12 of the first substrate 10 is rougher than the main surface (second main surface 802) of the electronic component 8, which is covered with the resin layer 5, the main surface being far from the mounting substrate 9. Thus, in the high frequency module 100 according to the first embodiment, adhesiveness between the first electronic component 1 and the shield layer 6 can be improved.

Furthermore, in the high frequency module 100 according to the first embodiment, unwanted waves (for example, unwanted bulk waves) propagating in a direction along the thickness direction of the lithium niobate substrate configuring the first substrate 10 can be made to scatter at the interface between the first substrate 10 and the shield layer 6, and filter characteristics of the acoustic wave filter 1 can thus be improved. Improvements of the filter characteristics include, for example, reduction of harmonic distortion and the like.

Furthermore, in the high frequency module 100 according to the first embodiment, the shield layer 6 includes the identification mark 600. Thus, in the high frequency module 100 according to the first embodiment, for example, a human is able to visually recognize the identification mark 600.

(3.2) Communication Apparatus

The communication apparatus 300 according to the first embodiment includes the high frequency module 100 described above and the signal processing circuit 301. The signal processing circuit 301 is connected to the high frequency module 100 and performs signal processing for a high frequency signal.

The communication apparatus 300 according to the first embodiment includes the high frequency module 100. Thus, heat dissipating characteristics of the acoustic wave filter 1 can be improved.

For example, a plurality of electronic components configuring the signal processing circuit 301 may be mounted on the circuit substrate described above or may be mounted on another circuit substrate (second circuit substrate) different from the circuit substrate (first circuit substrate) on which the high frequency module 100 is mounted.

In the high frequency module 100 according to the first embodiment, the first substrate 10 configuring the acoustic wave filter 1 is a lithium niobate substrate. However, the first substrate 10 is not necessarily a lithium niobate substrate and may be, for example, a lithium tantalate substrate. In the case where the first substrate 10 is a lithium tantalate substrate, temperature characteristics of the first substrate 10 are worse than the case where the first substrate 10 is a lithium niobate substrate, and the temperature characteristics of the acoustic wave filter 1 may thus be deteriorated. However, by making the second main surface 12 of the first substrate 10 contact with the shield layer 6, an increase of the temperature of the first substrate 10 can be reduced, and stable temperature characteristics of the acoustic wave filter 1 can thus be achieved.

Furthermore, in the high frequency module 100 according to the first embodiment, the second electronic component 2 is the reception filter 122A. However, the second electronic component 2 may be another circuit element such as the power amplifier 111.

(4) Modifications

Hereinafter, modifications of the first embodiment will be described. The modifications described below may be combined in an appropriate manner.

(4.1) First Modification

Figure 5:
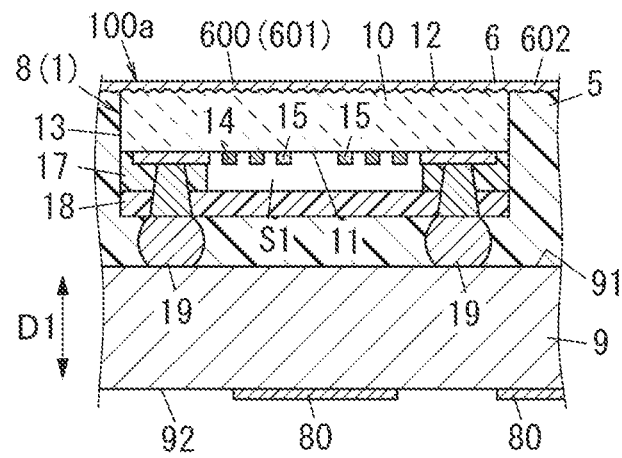
FIG. 5 is a cross-section view of an enlarged part of a high frequency module according to a first modification of the first embodiment.

A high frequency module 100a according to a first modification of the first embodiment will be described with reference to FIG. 5. Component elements of the high frequency module 100a according to the first modification similar to those of the high frequency module 100 according to the first embodiment will be denoted by the same signs and description for those component elements will be omitted.

The high frequency module 100*a* according to the first modification is different from the high frequency module 100 according to the first embodiment in that the first electronic component 1 configuring the acoustic wave filter 1 includes, as component elements of a first package structure, a first spacer layer 17, a first cover member 18, and a plurality of first terminals 19.

The first spacer layer 17 is provided near the first main surface 11 of the first substrate 10. The first spacer layer 17 surrounds the plurality of IDT electrodes 15 when viewed in plan from the thickness direction D1 of the mounting substrate 9. The first spacer layer 17 has a rectangular frame shape when viewed in plan from the thickness direction D1 of the mounting substrate 9. The first spacer layer 17 has electrical insulating characteristics. The first spacer layer 17 is made of epoxy resin, polyimide, or the like.

The first cover member 18 is provided near the first main surface 11 of the first substrate 10. The first cover member 18 has a flat plate shape. The first cover member 18 is arranged on the first spacer layer 17 in such a manner that the first cover member 18 faces the first substrate 10 in the thickness direction D1 of the mounting substrate 9. The first cover member 18 overlaps with the plurality of IDT electrodes 15 in the thickness direction D1 of the mounting substrate 9 and are away from the plurality of IDT electrodes 15 in the thickness direction D1 of the mounting substrate 9. The first cover member 18 has electrical insulating characteristics. The first cover member 18 is made of epoxy resin, polyimide, or the like.

The first electronic component 1 has a first space S1 that is surrounded by the first substrate 10, the first spacer layer 17, and the first cover member 18. The first space S1 is filled with gas such as air or inert gas (for example, nitrogen gas).

The plurality of first terminals 19 are exposed out of the first cover member 18. Each of the plurality of first terminals 19 is, for example, a bump. The bump is, for example, a solder bump. The bump is not necessarily a solder bump and may be, for example, a gold bump.

In the high frequency module 100*a* according to the first modification, the shield layer 6 is in contact with the second main surface 12 of the first substrate 10, as in the high frequency module 100 according to the first embodiment. In other words, in the high frequency module 100*a* according to the first modification, the shield layer 6 is in contact with the main surface (second main surface 802) of the acoustic wave filter 1 that is far from the mounting substrate 9. Thus, in the high frequency module 100*a* according to the first modification, heat dissipating characteristics of the acoustic wave filter 1 can be improved, as in the high frequency module 100 according to the first embodiment.

(4.2) Second Modification

Figure 6:
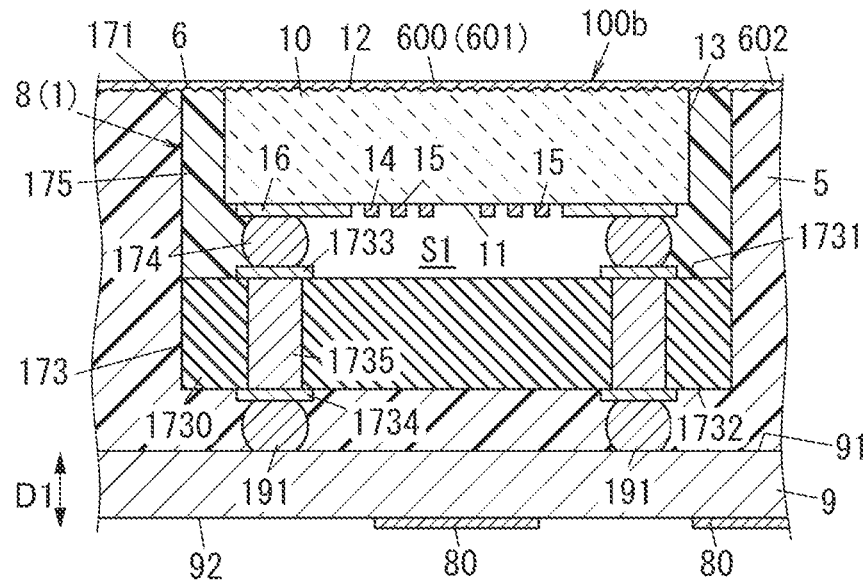
FIG. 6 is a cross-section view of an enlarged part of a high frequency module according to a second modification of the first embodiment.

A high frequency module 100*b* according to a second modification of the first embodiment will be described with reference to FIG. 6. Component elements of the high frequency module 100*b* according to the second modification similar to those of the high frequency module 100 according to the first embodiment will be denoted by the same signs and description for those component elements will be omitted.

The high frequency module 100*b* according to the second modification is different from the high frequency module 100 according to the first embodiment in that the first electronic component 1 configuring the acoustic wave filter 1 includes, as component elements of the first package structure, a first package substrate 173, a plurality of bumps 174, and a first sealing resin unit 175, in addition to a first filter chip 171 including the first substrate 10, the first circuit unit 14, and the plurality of first pad electrodes 16.

The first package substrate 173 includes a first supporting body 1730, a plurality of electrodes 1733, and a plurality of external connection electrodes 1734. The first supporting body 1730 has a flat plate shape and has a first main surface 1731 and a second main surface 1732 that face each other. The plurality of electrodes 1733 are arranged on the first main surface 1731 of the first supporting body 1730. Furthermore, the plurality of external connection electrodes 1734 are arranged on the second main surface 1732 of the first supporting body 1730.

The first package substrate 173 further includes a plurality of through electrodes 1735 that electrically connect the plurality of electrodes 1733 to the plurality of external connection electrodes 1734 in a one-to-one relationship. The first supporting body 1730 has electrical insulating characteristics. The first supporting body 1730 is, for example, a ceramic substrate (for example, alumina substrate). The outer peripheral shape of the first package substrate 173 is a rectangular shape. However, the first package substrate 173 does not necessarily have a rectangular shape and may have, for example, a square shape.

The plurality of bumps 174 bond the plurality of first pad electrodes 16 of the first filter chip 171 to the plurality of electrodes 1733 of the first package substrate 173.

The first sealing resin unit 175 is arranged on the first package substrate 173 and covers an outer peripheral surface of the first filter chip 171. In the first electronic component 1, the first space S1 surrounded by the first filter chip 171, the first package substrate 173, and the first sealing resin unit 175 is formed.

The first electronic component 1 is an acoustic wave filter of a CSP (Chip Size Package) type. The first filter chip 171 is flip-chip-mounted on the first package substrate 173, and the outer peripheral surface of the first filter chip 171 on the first package substrate 173 is covered by the first sealing resin unit 175. The size of the first package substrate 173 and the first sealing resin unit 175 is slightly larger than the chip size of the first filter chip 171 when viewed from the thickness direction of the first filter chip 171.

The high frequency module 100*b* further includes a plurality of first bumps 191 that are bonded to the plurality of external connection electrodes 1734 of the acoustic wave filter 1 and the mounting substrate 9.

In the high frequency module 100*b* according to the second modification, the shield layer 6 is in contact with the second main surface 12 of the first substrate 10, as in the high frequency module 100 according to the first embodiment. In other words, in the high frequency module 100*b* according to the second modification, the shield layer 6 is in contact with the main surface (second main surface 802) of the acoustic wave filter 1 that is far from the mounting substrate 9. Thus, in the high frequency module 100*b* according to the second modification, heat dissipating characteristics of the acoustic wave filter 1 can be improved, as in the high frequency module 100 according to the first embodiment.

(4.3) Third Modification

Figure 7:
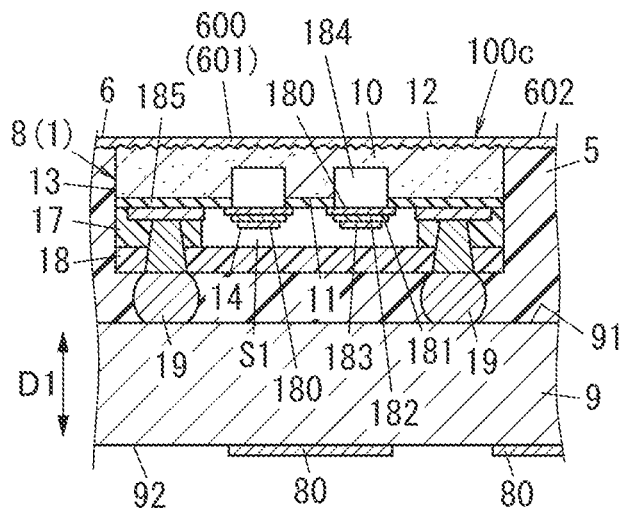
FIG. 7 is a cross-section view of an enlarged part of a high frequency module according to a third modification of the first embodiment.

A high frequency module 100*c* according to a third modification of the first embodiment will be described with reference to FIG. 7. Component elements of the high frequency module 100*c* according to the third modification similar to those of the high frequency module 100*a* according to the first modification of the first embodiment will be denoted by the same signs and description for those component elements will be omitted.

The high frequency module 100c according to the third modification is different from the high frequency module 100a according to the first modification in that the first electronic component 1 configuring the acoustic wave filter 1 is a BAW filter. In the high frequency module 100c according to the third modification, the first substrate 10 of the first electronic component 1 is a silicon substrate, and each of the plurality of acoustic wave resonators is a first BAW (Bulk Acoustic Wave) resonator 180. That is, in the high frequency module 100c according to the third modification, the first substrate 10 is a supporting substrate made of a silicon substrate.

The first BAW resonator 180 includes a first electrode 181, a piezoelectric film 182, and a second electrode 183. The piezoelectric film 182 is formed on the first electrode 181. The second electrode 183 is formed on the piezoelectric film 182.

The first BAW resonator 180 further includes an electrical insulating film 185 formed on the first main surface 11 of the first substrate 10. The electrical insulating film 185 is made of, for example, silicon oxide. The piezoelectric film 182 is made of, for example, AlN, ScAlN, or PZT.

The first BAW resonator 180 has a cavity 184 on a surface of the first electrode 181 that is far from the piezoelectric film 182. The first BAW resonator 180 is capable of suppressing propagation of acoustic wave energy toward the first substrate 10 by increasing the acoustic impedance ratio between the first electrode 181 and a medium immediately below the first electrode 181 and capable of increasing an electromechanical coupling coefficient compared to the case where no cavity 184 is provided. The first BAW resonator 180 is an FBAR (Film Bulk Acoustic Resonator).

In the high frequency module 100c according to the third modification, the shield layer 6 is in contact with the second main surface 12 of the first substrate 10, as in the high frequency module 100a according to the first modification. In other words, in the high frequency module 100c according to the third modification, the shield layer 6 is in contact with the main surface (second main surface 802) of the acoustic wave filter 1 that is far from the mounting substrate 9. Thus, in the high frequency module 100c according to the third modification, heat dissipating characteristics of the acoustic wave filter 1 can be improved as in the high frequency module 100a according to the first modification.

(4.4) Fourth Modification

Figure 8:
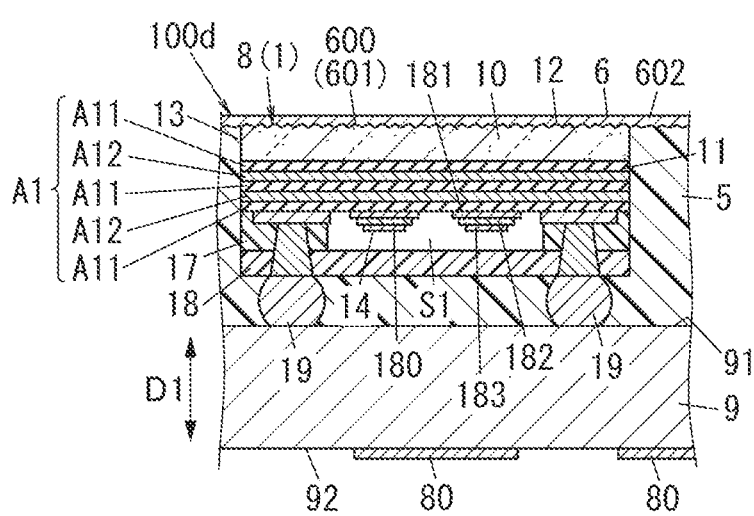
FIG. 8 is a cross-section view of an enlarged part of a high frequency module according to a fourth modification of the first embodiment.

A high frequency module 100d according to a fourth modification of a first embodiment will be described with reference to FIG. 8. Component elements of the high frequency module 100d according to the fourth modification similar to those of the high frequency module 100c according to the third modification of the first embodiment will be denoted by the same signs and description for those component elements will be omitted.

The high frequency module 100d according to the fourth modification is different from the high frequency module 100c according to the third modification in that the first BAW resonators 180 include an acoustic reflector layer A1 interposed between the first substrate 10 and the first electrodes 181 of the first BAW resonators 180. In the high frequency module 100d according to the fourth modification, the first substrate 10 is a supporting substrate made of a silicon substrate.

The acoustic reflector layer A1 is provided on the first main surface 11 of the first substrate 10. The plurality of first electrodes 181 are provided on the acoustic reflector layer A1. The acoustic reflector layer A1 includes at least one (in the example in the drawing, three) low acoustic impedance layers A11 and at least one (in the example in the drawing, two) high acoustic impedance layers A12. The acoustic impedance of the low acoustic impedance layers A11 is lower than the acoustic impedance of the high acoustic impedance layers A12.

In the high frequency module 100d according to the fourth modification, the first BAW resonators 180 are SMRs (Solidly Mounted Resonators). The plurality of high acoustic impedance layers A12 are made of, for example, platinum. The plurality of low acoustic impedance layers A11 are made of, for example, silicon oxide. The plurality of high acoustic impedance layers A12 are not necessarily made of platinum and may be made of metal such as tungsten or tantalum. Furthermore, the plurality of high acoustic impedance layers A12 are not necessarily made of metal and may be made of, for example, an insulator. The plurality of high acoustic impedance layers A12 are not necessarily made of the same materials and may be made of, for example, different materials. Furthermore, the plurality of low acoustic impedance layers A11 are not necessarily made of the same materials and may be made of, for example, different materials. Furthermore, the number of the high acoustic impedance layers A12 and the number of the low acoustic impedance layers A11 are not necessarily the same and may be different.

In the high frequency module 100d according to the fourth modification, the shield layer 6 is in contact with the second main surface 12 of the first substrate 10, as in the high frequency module 100c according to the third modification. In other words, in the high frequency module 100d according to the fourth modification, the shield layer 6 is in contact with the main surface (second main surface 802) of the acoustic wave filter 1 that is far from the mounting substrate 9. Thus, in the high frequency module 100d according to the fourth modification, heat dissipating characteristics of the acoustic wave filter 1 can be improved as in the high frequency module 100c according to the third modification.

(4.5) Fifth Modification

Figure 9:
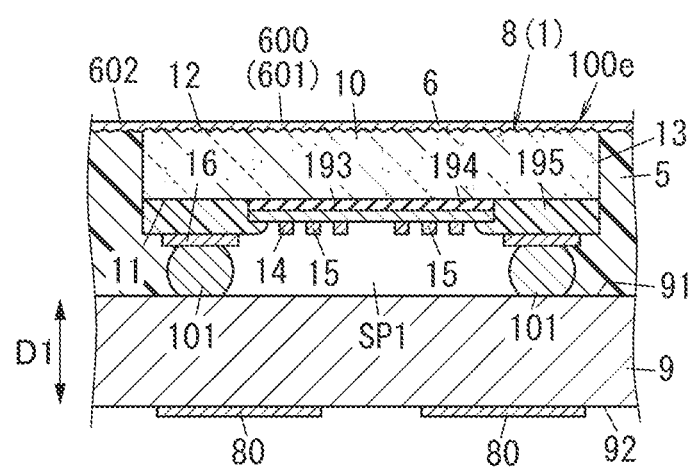
FIG. 9 is a cross-section view of an enlarged part of a high frequency module according to a fifth modification of the first embodiment.

A high frequency module 100e according to a fifth modification of the first embodiment will be described with reference to FIG. 9. Component elements of the high frequency module 100e according to the fifth modification similar to those of the high frequency module 100 according to the first embodiment will be denoted by the same signs and description for those component elements will be omitted.

The first electronic component 1 configuring the acoustic wave filter 1 is a bare-chip acoustic wave filter. The first electronic component 1 includes, as illustrated in FIG. 9, the first substrate 10, a low acoustic velocity film 193, a piezoelectric layer 194, the plurality of IDT electrodes 15, and the plurality of first pad electrodes 16. The low acoustic velocity film 193 is provided on the first main surface 11 of the first substrate 10. The piezoelectric layer 194 is provided on the low acoustic velocity film 193. The plurality of IDT electrodes 15 are provided on the piezoelectric layer 194. The plurality of first pad electrodes 16 are provided on the first main surface 11 of the first substrate 10. The first electronic component 1 has a rectangular shape when viewed in plan from the thickness direction thereof. However, the first electronic component 1 does not necessarily have a rectangular shape and may have, for example, a square shape.

The low acoustic velocity film 193 is positioned away from the outer periphery of the first substrate 10 when viewed in plan from the thickness direction of the acoustic wave filter 1. The acoustic wave filter 1 further includes an insulating layer 195. The insulating layer 195 covers a region of the first main surface 11 of the first substrate 10 that is not covered with the low acoustic velocity film 193. The insulating layer 195 has electrical insulating characteristics. The insulating layer 195 is formed along the outer periphery of the first substrate 10 on the first main surface 11 of the first substrate 10. The insulating layer 195 surrounds the plurality of IDT electrodes 15. The insulating layer 195 has a frame shape (for example, a rectangular frame shape) when viewed in plan from the thickness direction of the acoustic wave filter 1. Part of the insulating layer 195 overlaps with an outer peripheral part of the piezoelectric layer 194 in the thickness direction of the acoustic wave filter 1. The outer peripheral surface of the piezoelectric layer 194 and the outer peripheral surface of the low acoustic velocity film 193 are covered with the insulating layer 195. The insulating layer 195 is made of epoxy resin, polyimide, or the like.

The plurality of first pad electrodes 16 are provided on the first main surface 11 of the first substrate 10 with the insulating layer 195 interposed therebetween.

The piezoelectric layer 194 is made of, for example, lithium niobate or lithium tantalate. The low acoustic velocity film 193 is made of, for example, silicon oxide. The acoustic velocity of bulk waves propagating in the low acoustic velocity film 193 is lower than the acoustic velocity of bulk waves propagating in the piezoelectric layer 194. The low acoustic velocity film 193 is not necessarily made of silicon oxide and may be made of, for example, silicon oxide, glass, silicon oxynitride, tantalum oxide, a compound obtained by adding fluorine, carbon, or boron to silicon oxide, or a material containing a material mentioned above as a main component.

The first substrate 10 is, for example, a silicon substrate. The acoustic velocity of bulk waves propagating in the first substrate 10 is higher than the acoustic velocity of acoustic waves propagating in the piezoelectric layer 194. A bulk wave propagating in the first substrate 10 is the bulk wave of lowest acoustic velocity among a plurality of bulk waves propagating in the first substrate 10. In the high frequency module 100e according to the fifth modification, the first substrate 10 and the low acoustic velocity film 193 provided on the first substrate 10 configure a high acoustic velocity member. Furthermore, in the high frequency module 100e according to the fifth modification, the first substrate 10 is a supporting substrate made of a silicon substrate.

The thickness of the piezoelectric layer 194 is, for example, 3.5λ or less, where the wave length of an acoustic wave defined by an electrode finger period of the IDT electrodes 15 is represented by λ. The thickness of the low acoustic velocity film 193 is, for example, 2.0λ or less.

The acoustic wave filter 1 may further include a high acoustic velocity film provided between the first substrate 10 and the low acoustic velocity film 193. The acoustic velocity of bulk waves propagating in the high acoustic velocity film is higher than the acoustic velocity of acoustic waves propagating in the piezoelectric layer 194. The high acoustic velocity film is made of, for example, a material of at least one type selected from a group including diamond-like carbon, aluminum nitride, aluminum oxide, silicon carbide, silicon nitride, silicone, sapphire, piezoelectric body (lithium tantalate, lithium niobate, or quartz), alumina, zirconia, cordierite, mullite, steatite, forsterite, magnesia, and diamond. A material of the high acoustic velocity film may be a material containing any of the materials mentioned above as a main component or a material containing a mixture including any of the materials mentioned above as a main component.

The acoustic wave filter 1 may include a close contact layer interposed between the low acoustic velocity film 193 and the piezoelectric layer 194. The close contact layer is made of, for example, resin (epoxy resin or polyimide resin). Furthermore, the acoustic wave filter 1 may include a dielectric film between the low acoustic velocity film 193 and the piezoelectric layer 194, above the piezoelectric layer 194, or below the low acoustic velocity film 193.

In the high frequency module 100e according to the fifth modification, the shield layer 6 is in contact with the second main surface 12 of the first substrate 10, as in the high frequency module 100 according to the first embodiment. In other words, in the high frequency module 100e according to the fifth modification, the shield layer 6 is in contact with the main surface (second main surface 802) of the acoustic wave filter 1 that is far from the mounting substrate 9. Thus, in the high frequency module 100e according to the fifth modification, heat dissipating characteristics of the acoustic wave filter 1 can be improved as in the high frequency module 100 according to the first embodiment.

(Second Embodiment)

Figure 10:
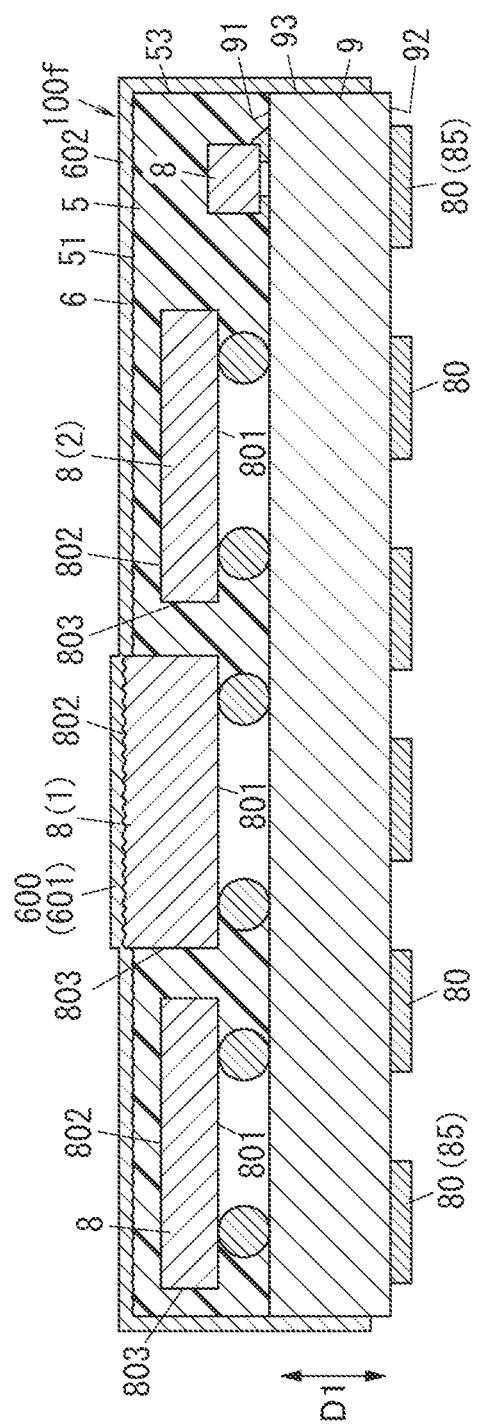
FIG. 10 is a cross-section view of a high frequency module according to a second embodiment.

A high frequency module 100f according to a second embodiment will be described with reference to FIG. 10. Component elements of the high frequency module 100f according to the second embodiment similar to those of the high frequency module 100 according to the first embodiment will be denoted by the same signs and description for those component elements will be omitted. The circuit configuration of the high frequency module 100f is similar to the circuit configuration of the high frequency module 100 according to the first embodiment described above with reference to FIG. 1.

In the high frequency module 100f according to the second embodiment, the first electronic component 1 is an acoustic wave filter (hereinafter, may also be referred to as an "acoustic wave filter 1"). The first electronic component 1 is the transmission filter 112A provided on the signal path T1 (see FIG. 1) for transmission signals. The second electronic component 2 is the reception filter 122A provided on the signal path R1 (see FIG. 1) for reception signals. The second main surface 802 of the first electronic component 1 that is far from the mounting substrate 9 protrudes, in a direction away from the mounting substrate 9 (toward the shield layer 6), relative to the main surface 51 of the resin layer 5 that is far from the mounting substrate 9. Therefore, the second main surface 802 of the first electronic component 1 is in contact with the shield layer 6, and part of the outer peripheral surface 803 of the first electronic component 1 is in contact with the shield layer 6. That is, in the high frequency module 100f according to the second embodiment, the shield layer 6 is in contact with the second main surface 802 and part of the outer peripheral surface 803 of the first electronic component 1 configuring the acoustic wave filter 1.

In the high frequency module 100f according to the second embodiment, the thickness of a substrate configuring the first electronic component 1 and the thickness of a substrate configuring the second electronic component 2 are different. Specifically, in the high frequency module 100f according to the second embodiment, the thickness of the substrate configuring the first electronic component 1 is larger than the thickness of the substrate configuring the second electronic component 2.

Furthermore, in the high frequency module 100f according to the second embodiment, the shield layer 6 includes the identification mark 600. The identification mark 600 includes, as illustrated in FIG. 10, the first part 601. The first part 601 is a part of the shield layer 6 that overlaps with the first electronic component (acoustic wave filter) 1 in the thickness direction D1 of the mounting substrate 9. In the thickness direction D1 of the mounting substrate 9, the first part 601 protrudes, in a direction away from the mounting substrate 9, relative to the second part 602 that is a part of the shield layer 6 other than the first part 601.

In the high frequency module 100f according to the second embodiment, as described above, the second main surface 802 and part of the outer peripheral surface 803 of the first electronic component 1 are in contact with the shield layer 6. Thus, heat generated at the first electronic component 1 can be transmitted to the shield layer 6 through the second main surface 802 and the outer peripheral surface 803 of the first electronic component 1. Therefore, compared to the case where only the second main surface 802 is in contact with the shield layer 6, heat dissipating characteristics of the first electronic component (acoustic wave filter) 1 can further be improved.

Furthermore, in the high frequency module 100f according to the second embodiment, as described above, in the thickness direction D1 of the mounting substrate 9, the first part 601 of the shield layer 6 protrudes, in the direction away from the mounting substrate 9, relative to the second part 602. Thus, the first part 601 and the second part 602 can be distinguished from each other, and the orientation of the high frequency module 100f can be identified according to the position of the first part 601. That is, the first part 601 of the shield layer 6 functions as the identification mark 600 of the high frequency module 100f.

(Third Embodiment)

Figure 11:
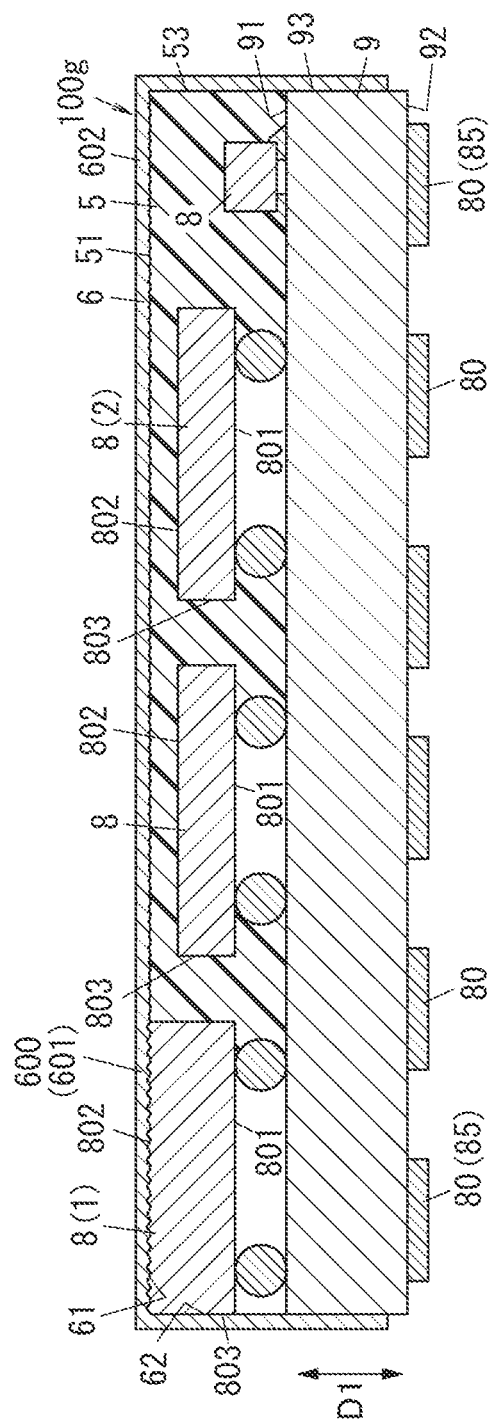
FIG. 11 is a cross-section view of a high frequency module according to a third embodiment.

A high frequency module 100g according to a third embodiment will be described with reference to FIG. 11. Component elements of the high frequency module 100g according to the third embodiment similar to those of the high frequency module 100 according to the first embodiment will be denoted by the same signs and description for those component elements will be omitted. The circuit configuration of the high frequency module 100g is similar to the circuit configuration of the high frequency module 100 according to the first embodiment described above with reference to FIG. 1.

In the high frequency module 100g according to the third embodiment, the first electronic component 1 is an acoustic wave filter (hereinafter, may also be referred to as an "acoustic wave filter 1"). The first electronic component 1 is the transmission filter 112A provided on the signal path T1 (see FIG. 1) for transmission signals. The second electronic component 2 is the reception filter 122A provided on the signal path R1 (see FIG. 1) for reception signals. In the high frequency module 100g according to the third embodiment, as illustrated in FIG. 11, the second main surface 802 and the outer peripheral surface 803 of the first electronic component 1 configuring the acoustic wave filter 1 are in contact with the shield layer 6. In other words, as illustrated in FIG. 11, the shield layer 6 includes a first contact part 61 and a second contact part 62. The first contact part 61 is a part that is in contact with the second main surface 802 of the first electronic component (acoustic wave filter) 1. The second contact part 62 is a part that is in contact with the outer peripheral surface 803 of the first electronic component 1.

Furthermore, in the high frequency module 100g according to the third embodiment, the second main surface 802 of the first electronic component 1 and the main surface 51 of the resin layer 5 that is far from the mounting substrate 9 form substantially the same plane.

In the high frequency module 100g according to the third embodiment, the thickness of a substrate configuring the first electronic component 1 and the thickness of a substrate configuring the second electronic component 2 are different. Specifically, in the high frequency module 100g according to the third embodiment, the thickness of the substrate configuring the first electronic component 1 is larger than the thickness of the substrate configuring the second electronic component 2.

In the high frequency module 100g according to the third embodiment, the second main surface 802 and the outer peripheral surface 803 of the first electronic component (acoustic wave filter) 1 are in contact with the shield layer 6. Thus, heat generated at the acoustic wave filter 1 can be transmitted to the shield layer 6 through the second main surface 802 and the outer peripheral surface 803. Therefore, compared to the case where only the second main surface 802 of the first electronic component 1 is in contact with the shield layer 6, heat dissipating characteristics of the acoustic wave filter 1 can further be improved.

In the high frequency module 100g according to the third embodiment, the second main surface 802 of the first electronic component 1 and the main surface 51 of the resin layer 5 form substantially the same plane. However, the second main surface 802 of the first electronic component 1 may protrude relative to the main surface 51 of the resin layer 5 in a direction away from the mounting substrate 9.

(Fourth Embodiment)

A high frequency module 100h according to a fourth embodiment will be described with reference to FIG. 12. Component elements of the high frequency module 100h according to the fourth embodiment similar to those of the high frequency module 100 according to the first embodiment will be denoted by the same signs and description for those component elements will be omitted. The circuit configuration of the high frequency module 100h is similar to the circuit configuration of the high frequency module 100 according to the first embodiment described above with reference to FIG. 1.

In the high frequency module 100h according to the fourth embodiment, the first electronic component 1 is an acoustic wave filter (hereinafter, may also be referred to as an "acoustic wave filter 1"). The first electronic component 1 is the transmission filter 112A provided on the signal path T1 (see FIG. 1) for transmission signals. The second electronic component 2 is the reception filter 122A provided on the signal path R1 (see FIG. 1) for reception signals.

In the high frequency module 100h according to the fourth embodiment, the first electronic component (acoustic wave filter) 1 is mounted on the first main surface 91 of the mounting substrate 9 with a plurality of first bumps 201 interposed therebetween. Furthermore, other electronic components 8 including the second electronic component 2 are mounted on the first main surface 91 of the mounting substrate 9 with a plurality of second bumps 202 interposed therebetween.

Figure 12:
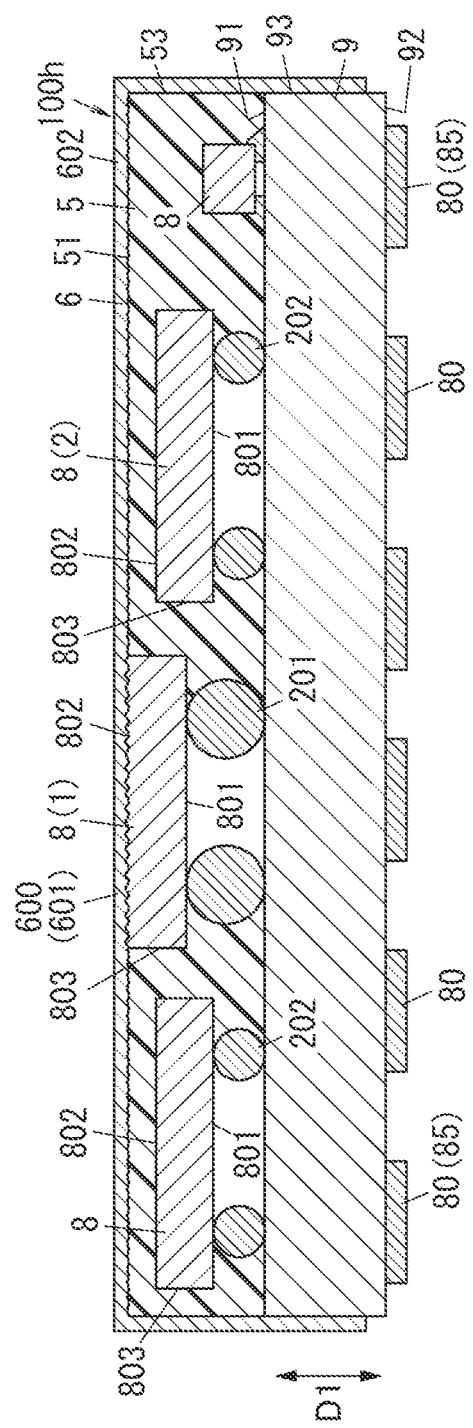
FIG. 12 is a cross-section view of a high frequency module according to a fourth embodiment.

In the high frequency module 100h according to the fourth embodiment, as illustrated in FIG. 12, the size of each of the plurality of first bumps 201 is larger than the size of each of the plurality of second bumps 202. Specifically, the diameter of each of the first bumps 201 is, for example, 180 nanometers, and the diameter of each of the second bumps 202 is, for example, 80 nanometers. Furthermore, in the high frequency module 100h according to the fourth embodiment, the thickness of a substrate configuring the first electronic component 1 and the thickness of a substrate configuring the second electronic component 2 are substantially the same.

In the high frequency module 100h according to the fourth embodiment, by making the size of the first bumps 201 larger than the size of the second bumps 202, the second main surface 802 of the first electronic component 1 can be made in contact with the shield layer 6.

In the high frequency module 100h according to the fourth embodiment, in a state in which the first electronic component 1 and the second electronic component 2 are mounted on the mounting substrate 9, the first main surface 801 of the first electronic component (acoustic wave filter) 1 that is near the mounting substrate 9 is farther away from the mounting substrate 9 than the first main surface 801 of the second electronic component 2 that is near the mounting substrate 9 is.

In the high frequency module 100h according to the fourth embodiment, by making the size of the first bumps 201 larger than the size of the second bumps 202, the second main surface 802 of the first electronic component 1 can be made in contact with the shield layer 6, and heat generated at the first electronic component 1 can be transmitted to the shield layer 6 through the second main surface 802. Thus, heat dissipating characteristics of the acoustic wave filter 1 can be improved.

Furthermore, in the high frequency module 100h according to the fourth embodiment, as described above, the position of the first main surface 801 of the first electronic component 1 and the position of the first main surface 801 of the second electronic component 2 are different. In the case where each of the first electronic component 1 and the second electronic component 2 is a filter as in the high frequency module 100h according to the fourth embodiment, interference of a signal between the first electronic component 1 and the second electronic component 2 can be reduced. In the high frequency module 100h according to the fourth embodiment, the second electronic component 2 is a second element.

In the high frequency module 100h according to the fourth embodiment, by changing the size of the first bumps 201, the position of the first electronic component 1 relative to the mounting substrate 9 is changed. However, the size of the first bumps 201 is not necessarily changed to change the position of the first electronic component 1 relative to the mounting substrate 9. For example, a plurality of bumps with the same size as the second bumps 202 may be arranged in the thickness direction D1 of the mounting substrate 9 so that the position of the first electronic component 1 relative to the mounting substrate 9 is changed.

Furthermore, in the high frequency module 100h according to the fourth embodiment, the second main surface 802 of the first electronic component 1 and the main surface 51 of the resin layer 5 form substantially the same plane. However, the second main surface 802 of the first electronic component 1 may protrude relative to the main surface 51 of the resin layer 5 in a direction away from the mounting substrate 9.

(Fifth Embodiment)

Figure 13:
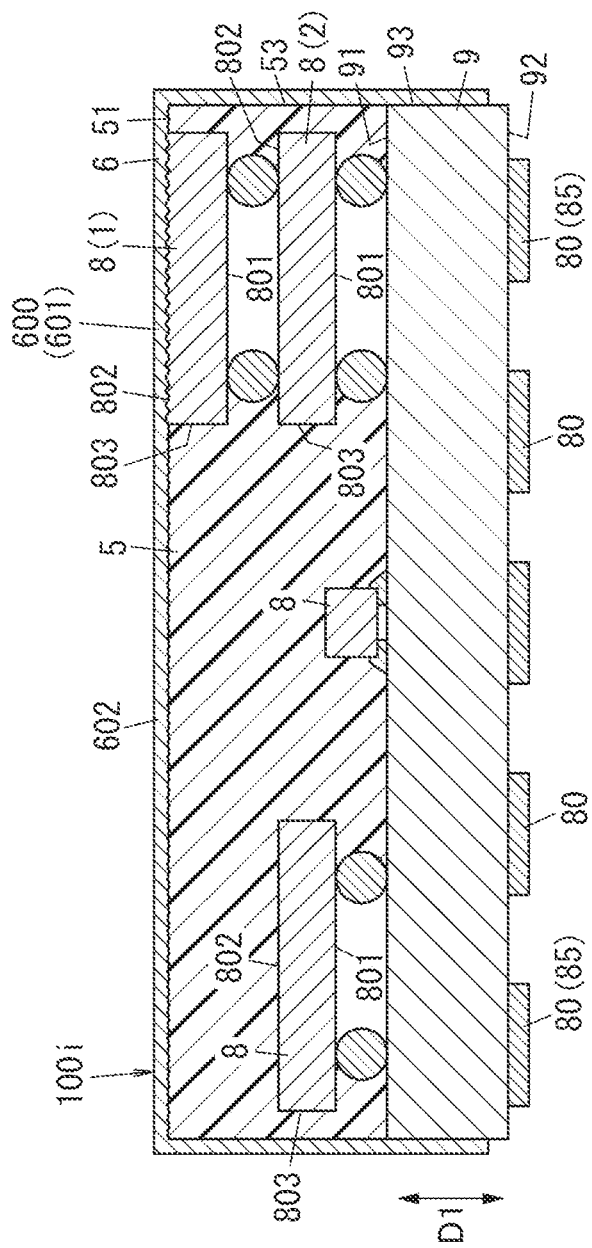
FIG. 13 is a cross-section view of a high frequency module according to a fifth embodiment.

A high frequency module 100i according to a fifth embodiment will be described with reference to FIG. 13. Component elements of the high frequency module 100i according to the fifth embodiment similar to those of the high frequency module 100 according to the first embodiment will be denoted by the same signs and description for those component elements will be omitted. The circuit configuration of the high frequency module 100i is similar to the circuit configuration of the high frequency module 100 according to the first embodiment described above with reference to FIG. 1.

In the high frequency module 100i according to the fifth embodiment, the first electronic component 1 is an acoustic wave filter (hereinafter, may also be referred to as an "acoustic wave filter 1"). The first electronic component 1 is the transmission filter 112A provided on the signal path T1 (see FIG. 1) for transmission signals. The second electronic component 2 is the reception filter 122A provided on the signal path R1 (see FIG. 1) for reception signals.

The second electronic component 2 is arranged on the first main surface 91 of the mounting substrate 9. The first electronic component 1 is arranged on the second main surface 802 of the second electronic component 2. That is, in the high frequency module 100i according to the fifth embodiment, the first electronic component 1 and the second electronic component 2 are stacked on the first main surface 91 of the mounting substrate 9. Furthermore, in the high frequency module 100i according to the fifth embodiment, the second main surface 802 of the first electronic component 1 configuring the acoustic wave filter 1 is in contact with the shield layer 6. Furthermore, in the high frequency module 100i according to the fifth embodiment, the second main surface 802 of the first electronic component 1 and the main surface 51 of the resin layer 5 that is far from the mounting substrate 9 form substantially the same plane. In the high frequency module 100i according to the fifth embodiment, the second electronic component 2 is a high frequency element.

In the high frequency module 100i according to the fifth embodiment, the second main surface 802 of the first electronic component (acoustic wave filter) 1 is in contact with the shield layer 6. Thus, heat generated at the first electronic component 1 can be transmitted to the shield layer 6 through the second main surface 802 of the first electronic component 1. Therefore, heat dissipating characteristics of the acoustic wave filter 1 can be improved. In particular, out of the transmission filter 112A configured as the first electronic component 1 and the reception filter 122A configured as the second electronic component 2, the transmission filter 112A, which has a relatively large amount of heat generation, is in contact with the shield layer 6. Thus, stable temperature characteristics of the high frequency module 100i can be achieved. Furthermore, by causing heat generated at the transmission filter 112A to be dissipated through the shield layer 6, thermal diffusion to other electronic components 8 (including the second electronic component 2 as the reception filter 122A) can be reduced, and variations in characteristics of the other electronic components 8 can be reduced.

Furthermore, in the high frequency module 100i according to the fifth embodiment, the first electronic component 1 is arranged on the second main surface 802 of the second electronic component 2. Thus, compared to the case where both the first electronic component 1 and the second electronic component 2 are arranged on the mounting substrate 9, the area of the first main surface 91 of the mounting substrate 9 can be made small, and size reduction when viewed from the thickness direction D1 of the mounting substrate 9 can be achieved.

(Sixth Embodiment)

Figure 14:
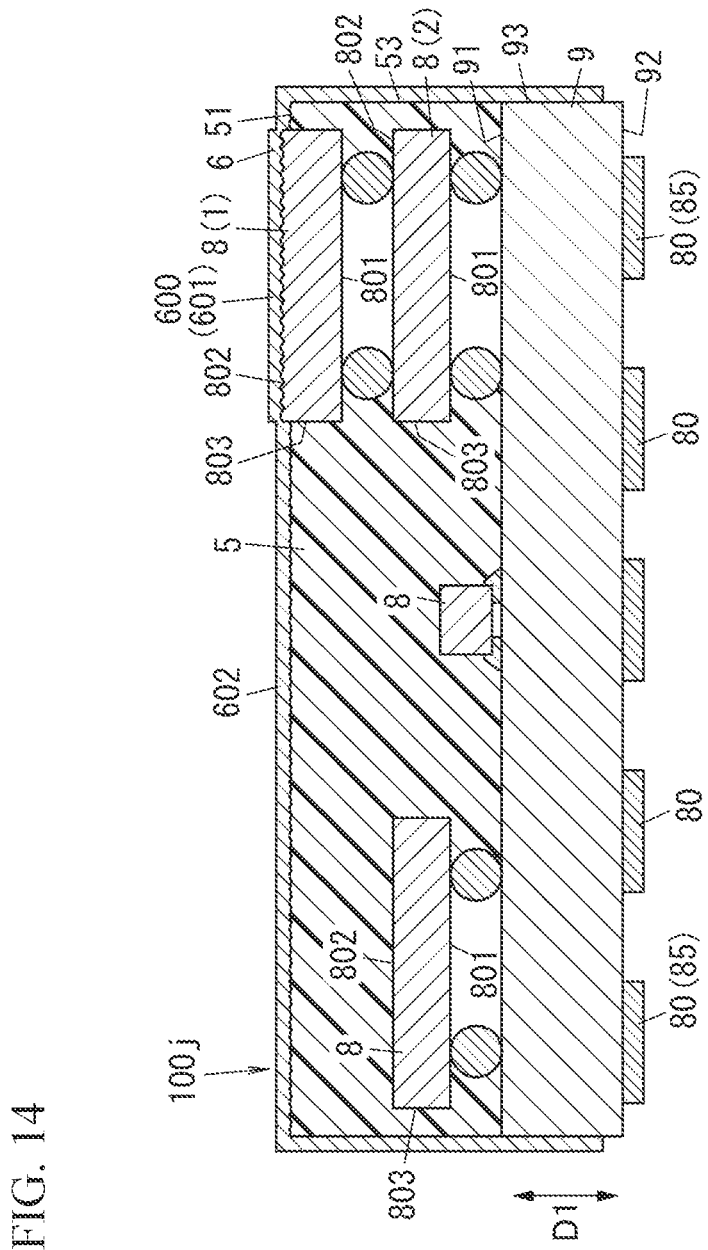
FIG. 14 is a cross-section view of a high frequency module according to a sixth embodiment.

A high frequency module 100j according to a sixth embodiment will be described with reference to FIG. 14.

Component elements of the high frequency module 100*j* according to the sixth embodiment similar to those of the high frequency module 100*i* according to the fifth embodiment will be denoted by the same signs and description for those component elements will be omitted. The circuit configuration of the high frequency module 100*j* is similar to the circuit configuration of the high frequency module 100 according to the first embodiment described above with reference to FIG. 1.

In the high frequency module 100*j* according to the sixth embodiment, the first electronic component 1 is an acoustic wave filter (hereinafter, may also be referred to as an "acoustic wave filter 1"). The first electronic component 1 is the transmission filter 112A provided on the signal path T1 (see FIG. 1) for transmission signals. The second electronic component 2 is the reception filter 122A provided on the signal path R1 (see FIG. 1) for reception signals.

The second electronic component 2 is arranged on the first main surface 91 of the mounting substrate 9. The first electronic component 1 is arranged on the second main surface 802 of the second electronic component 2. That is, in the high frequency module 100*j* according to the sixth embodiment, the first electronic component 1 and the second electronic component 2 are stacked on the first main surface 91 of the mounting substrate 9. Furthermore, in the high frequency module 100*j* according to the sixth embodiment, the second main surface 802 of the first electronic component 1 configuring the acoustic wave filter 1 is in contact with the shield layer 6. In the high frequency module 100*j* according to the sixth embodiment, the second electronic component 2 is a high frequency element.

Furthermore, in the high frequency module 100*j* according to the sixth embodiment, in the thickness direction D1 of the mounting substrate 9, the second main surface 802 of the first electronic component 1 protrudes, in a direction away from the mounting substrate 9 (toward the shield layer 6), relative to the main surface 51 of the resin layer 5 that is far from the mounting substrate 9. Therefore, the second main surface 802 of the first electronic component 1 is in contact with the shield layer 6, and part of the outer peripheral surface 803 of the first electronic component 1 is in contact with the shield layer 6. That is, in the high frequency module 100*j* according to the sixth embodiment, the shield layer 6 is in contact with the second main surface 802 and part of the outer peripheral surface 803 of the first electronic component 1 configuring the acoustic wave filter 1. Thus, compared to the case where only the second main surface 802 of the first electronic component (acoustic wave filter) 1 is in contact with the shield layer 6, heat dissipating characteristics of the acoustic wave filter 1 can further be improved.

Furthermore, in the high frequency module 100*j* according to the sixth embodiment, the shield layer 6 includes the identification mark 600. The identification mark 600 includes, as illustrate in FIG. 14, the first part 601. The first part 601 is a part of the shield layer 6 that overlaps with the first electronic component (acoustic wave filter) 1 in the thickness direction D1 of the mounting substrate 9. In the thickness direction D1 of the mounting substrate 9, the first part 601 protrudes, in the direction away from the mounting substrate 9, relative to the second part 602 that is a part of the shield layer 6 other than the first part 601. Thus, the first part 601 and the second part 602 can be distinguished from each other, and the orientation of the high frequency module 100*f* can be identified according to the position of the first part 601. That is, the first part 601 of the shield layer 6 functions as the identification mark 600 of the high frequency module 100*j*.

(Seventh Embodiment)

Figure 15:
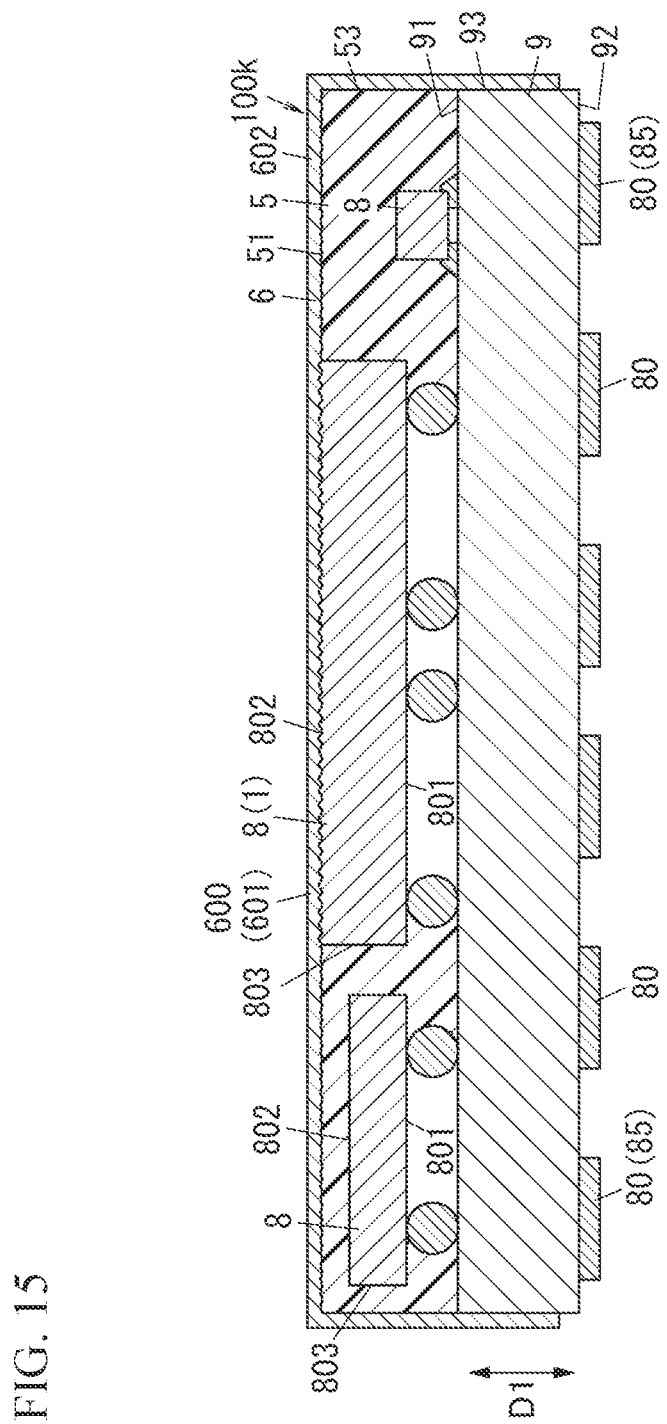
FIG. 15 is a cross-section view of a high frequency module according to a seventh embodiment.

A high frequency module 100*k* according to a seventh embodiment will be described with reference to FIG. 15. Component elements of the high frequency module 100*k* according to the seventh embodiment similar to those of the high frequency module 100 according to the first embodiment will be denoted by the same signs and description for those component elements will be omitted. The circuit configuration of the high frequency module 100*k* is similar to the circuit configuration of the high frequency module 100 according to the first embodiment described above with reference to FIG. 1.

In the high frequency module 100*k* according to the seventh embodiment, the first electronic component 1 is, for example, a single-chip electronic component including the transmission filter 112A and the reception filter 122A. Thus, in the high frequency module 100*k* according to the seventh embodiment, compared to the high frequency module 100 according to the first embodiment, the area of the first main surface 91 of the mounting substrate 9 can be made small, and size reduction when viewed from the thickness direction D1 of the mounting substrate 9 can be achieved. In the high frequency module 100*k* according to the seventh embodiment, the transmission filter 112A, out of the transmission filter 112A and the reception filter 122A included in the first electronic component 1, is an acoustic wave filter (hereinafter, may also be referred to as an "acoustic wave filter 1").

Furthermore, in the high frequency module 100*k* according to the seventh embodiment, the shield layer 6 is in contact with the second main surface 12 of the first substrate 10 (see FIG. 3), as in the high frequency module 100 according to the first embodiment. Thus, heat dissipating characteristics of the first electronic component (acoustic wave filter) 1 can be improved.

In the high frequency module 100*k* according to the seventh embodiment, the second main surface 802 of the first electronic component 1 and the main surface 51 of the resin layer 5 form substantially the same plane. However, the second main surface 802 of the first electronic component 1 may protrude relative to the main surface 51 of the resin layer 5 in the direction away from the mounting substrate 9.

(Eighth Embodiment)

Figure 16:
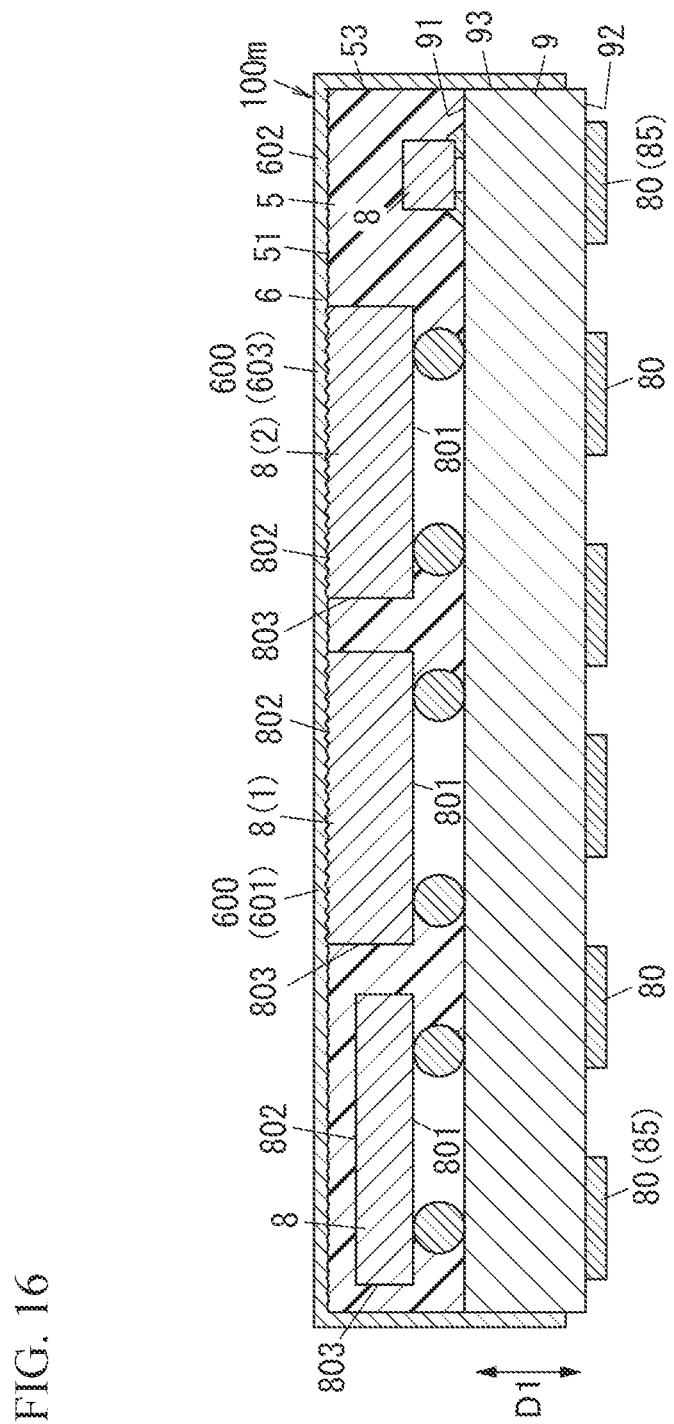
FIG. 16 is a cross-section view of a high frequency module according to an eighth embodiment.
Figure 17:
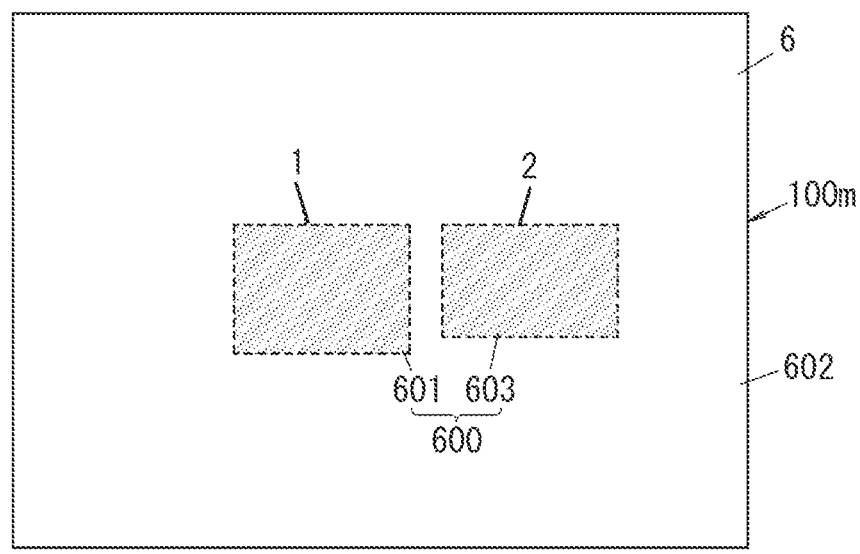
FIG. 17 is a plan view of the high frequency module.

A high frequency module 100*m* according to an eighth embodiment will be described with reference to FIGS. 16 and 17. Component elements of the high frequency module 100*m* according to the eighth embodiment similar to those of the high frequency module 100 according to the first embodiment will be denoted by the same signs and description for those component elements will be omitted. The circuit configuration of the high frequency module 100*m* is similar to the circuit configuration of the high frequency module 100 according to the first embodiment described above with reference to FIG. 1.

In the high frequency module 100*m* according to the eighth embodiment, the first electronic component 1 and the second electronic component 2 are acoustic wave filters (hereinafter, may also be referred to as "acoustic wave filters 1 and 2"). Furthermore, in the high frequency module 100*m* according to the eighth embodiment, the acoustic wave filters 1 and 2 are surface acoustic wave filters. In the high frequency module 100*m* according to the eighth embodiment, the acoustic wave filter 1 is the transmission filter 112A provided on the signal path T1 (see FIG. 1) for transmission signals. Furthermore, in the high frequency module 100*m* according to the eighth embodiment, the acoustic wave filter 2 is the reception filter 122A provided on the signal path R1 (see FIG. 1) for reception signals.

Each of the acoustic wave filters 1 and 2 includes, for example, a substrate having a first main surface and a second main surface that face each other and a circuit unit formed near the first main surface of the substrate. The substrate is a piezoelectric substrate. The piezoelectric substrate is, for example, a lithium tantalate substrate. The circuit unit includes a plurality of IDT electrodes that are associated with a plurality of series-arm resonators in a one-to-one relationship and a plurality of IDT electrodes that are associated with a plurality of parallel-arm resonators in a one-to-one relationship.

Each of the acoustic wave filters 1 and 2 is flip-chip mounted on the first main surface 91 of the mounting substrate 9 in such a manner that the first main surface, out of the first main surface and the second main surface, of the substrate is near the mounting substrate 9. In the high frequency module 100m according to the eighth embodiment, the second main surface 802 of each of the acoustic wave filters 1 and 2 that is far from the mounting substrate 9 is in contact with the shield layer 6.

In the high frequency module 100m according to the eighth embodiment, the second main surface 802 of each of the acoustic wave filters 1 and 2 that is far from the mounting substrate 9 is in contact with the shield layer 6. Thus, heat generated at each of the acoustic wave filters 1 and 2 can be transmitted to the shield layer 6 through the second main surface 802. Therefore, heat dissipating characteristics of each of the acoustic wave filters 1 and 2 can be improved. In the high frequency module 100m according to the eighth embodiment, the acoustic wave filter (second electronic component) 2 is an electronic component.

Furthermore, in the high frequency module 100m according to the eighth embodiment, a substrate configuring each of the acoustic wave filters 1 and 2 is a lithium tantalate substrate whose temperature characteristics are worse than those of a lithium niobate substrate. Thus, by making the second main surface of the substrate of each of the acoustic wave filters 1 and 2 contact with the shield layer 6, the temperature characteristics of the acoustic wave filters 1 and 2 can be improved.

Furthermore, in the high frequency module 100m according to the eighth embodiment, the shield layer 6 includes the identification mark 600. The identification mark 600 includes the first part 601 and a third part 603, as illustrated in FIG. 17. The first part 601 is a part of the shield layer 6 that overlaps with the first electronic component (acoustic wave filter) 1 in the thickness direction D1 of the mounting substrate 9. The third part 603 is a part of the shield layer 6 that overlaps with the second electronic component 2 in the thickness direction D1 of the mounting substrate 9. In the high frequency module 100m according to the eighth embodiment, for example, the degree of reflection of light incident to the first part 601 and the third part 603 from the outside is different from the degree of reflection of light incident to the second part 602 from the outside. Thus, in the high frequency module 100m according to the eighth embodiment, colors of the first part 601 and the third part 603 are different from the color of the second part 602 for human eyes. In FIG. 17, a plan view of the high frequency module 100m is illustrated. For easier understanding of distinction of the first part 601 and the third part 603 from the second part 602, the first part 601 and the third part 603 are hatched with dots.

In the high frequency module 100m according to the eighth embodiment, each of the acoustic wave filters 1 and 2 is a lithium tantalate substrate. However, for example, a substrate of at least one of the acoustic wave filters 1 and 2 may be a lithium niobate substrate. Even in this case, by making each of the acoustic wave filters 1 and 2 contact with the shield layer 6, temperature characteristics of the acoustic wave filters 1 and 2 can be improved.

(Ninth Embodiment)

Figure 18:
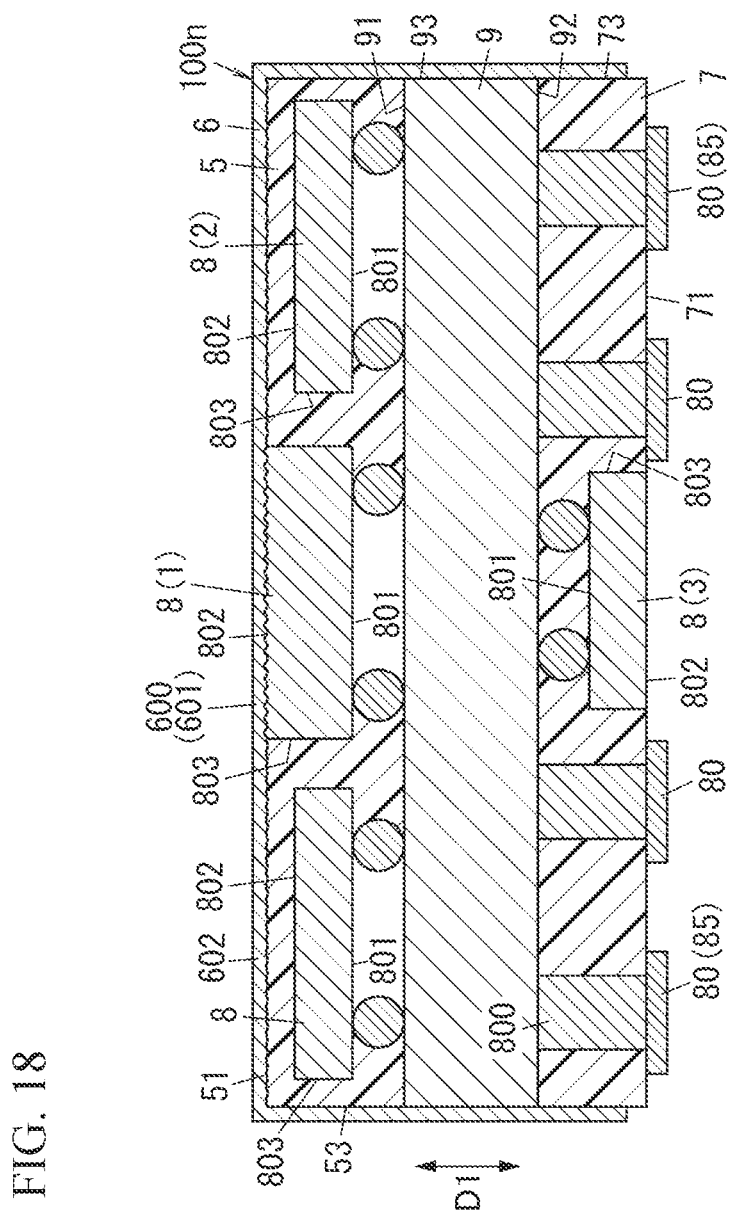
FIG. 18 is a cross-section view of a high frequency module according to a ninth embodiment.

A high frequency module 100n according to a ninth embodiment will be described with reference to FIG. 18. Component elements of the high frequency module 100n according to the ninth embodiment similar to those of the high frequency module 100 according to the first embodiment will be denoted by the same signs and description for those component elements will be omitted. The circuit configuration of the high frequency module 100n is similar to the circuit configuration of the high frequency module 100 according to the first embodiment described above with reference to FIG. 1.

In the high frequency module 100n according to the ninth embodiment, the plurality of electronic components 8 include the first electronic component 1, the second electronic component 2, and a third electronic component 3. The first electronic component 1 and the second electronic component 2 are arranged on the first main surface 91 of the mounting substrate 9. The third electronic component 3 is arranged on the second main surface 92 of the mounting substrate 9. That is, the plurality of electronic components 8 are mounted on both the first main surface 91 and the second main surface 92 of the mounting substrate 9. Thus, compared to the high frequency module 100 according to the first embodiment, the size of the high frequency module 100n according to ninth embodiment when viewed from the thickness direction D1 of the mounting substrate 9 can be made small. In the high frequency module 100n according to the ninth embodiment, the third electronic component 3 is a circuit element.

Furthermore, in the high frequency module 100n according to the ninth embodiment, each of the plurality of external connection terminals 80 includes a columnar electrode 800. Each of the columnar electrodes 800 is, for example, an electrode of a column shape.

The high frequency module 100n according to the ninth embodiment further includes a resin layer 7. The resin layer 7 covers the outer peripheral surface 803 of the third electronic component 3 arranged on the second main surface 92 of the mounting substrate 9 and an outer peripheral surface of each of the columnar electrodes 800.

The resin layer 7 is formed in such a manner that the second main surface 802 of the electronic component 8 configuring the third electronic component 3 is exposed. The resin layer 7 includes resin (for example, epoxy resin). The resin layer 7 may include a filler as well as resin. The resin layer 7 may be made of the same material as that of the resin layer 5 or may be made of a material different from that of the resin layer 5. In the high frequency module 100n according to the ninth embodiment, the shield layer 6 also covers an outer peripheral surface 73 of the resin layer 7.

Furthermore, in the high frequency module 100n according to the ninth embodiment, the second main surface 802 of the electronic component 8 configuring the third electronic component 3 and a main surface 71 of the resin layer 7 that is far from the mounting substrate 9 form substantially the same plane.

In the high frequency module 100n according to the ninth embodiment, the shield layer 6 is in contact with the second main surface 12 of the first substrate 10 (see FIG. 3) as in the high frequency module 100 according to the first embodiment. Thus, heat dissipating characteristics of the first electronic component (acoustic wave filter) 1 can be improved.

Furthermore, in the high frequency module 100n according to the ninth embodiment, the resin layer 7 is formed in such a manner that the second main surface 802 of the third electronic component 3 is exposed. Thus, an increase of temperature of the third electronic component 3 can be reduced. Furthermore, with the configuration in which the electronic component 8 is arranged on the second main surface 92 of the mounting substrate 9, the height of the high frequency module 100n according to the ninth embodiment can be reduced.

(Tenth Embodiment)

Figure 19:
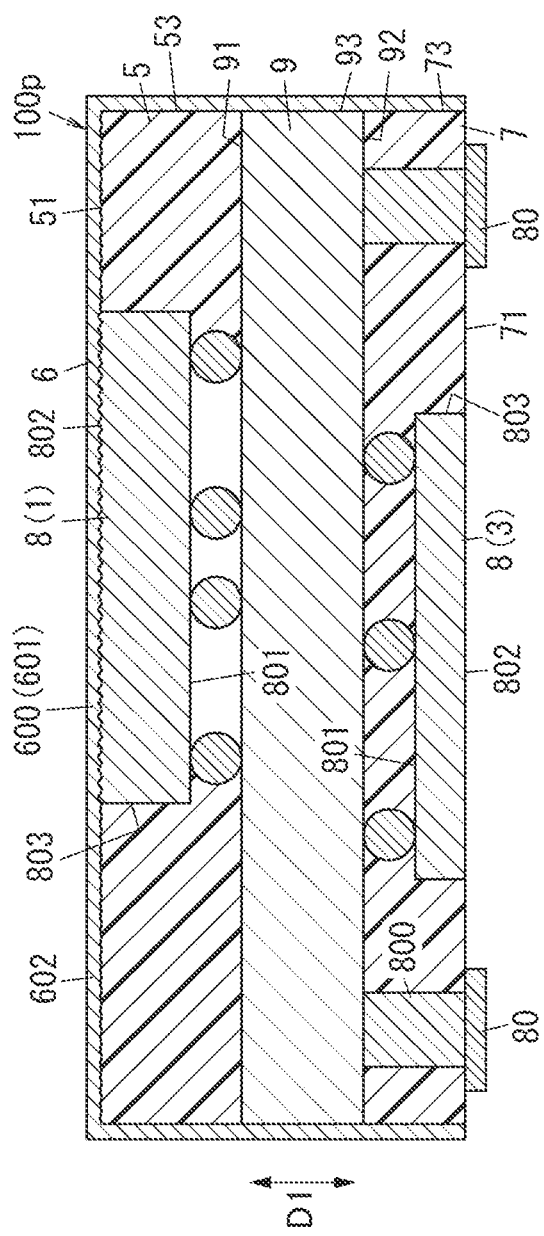
FIG. 19 is a cross-section view of a high frequency module according to a tenth embodiment.

A high frequency module 100p according to a tenth embodiment will be described with reference to FIGS. 19 and 20. Component elements of the high frequency module 100p according to the tenth embodiment similar to those of the high frequency module 100k according to the seventh embodiment will be denoted by the same signs and description for those component elements will be omitted. The circuit configuration of the high frequency module 100p is similar to the circuit configuration of the high frequency module 100 according to the first embodiment described above with reference to FIG. 1.

In the high frequency module 100p according to the tenth embodiment, the plurality of electronic components 8 include the first electronic component 1 and the third electronic component 3. The first electronic component 1 is, for example, a single-chip electronic component including the transmission filter 112A (see FIG. 1) and the reception filter 122A (see FIG. 1). The third electronic component 3 is, for example, an IC chip including the low noise amplifier 121 (see FIG. 1). Furthermore, in the high frequency module 100p according to the tenth embodiment, the mounting substrate 9 includes an inner-layer inductor 94 (see FIG. 20). The inner-layer inductor 94 is, for example, an inductor between the reception filter 122A and the selection terminal 161 of the third switch 106. In the high frequency module 100p according to the tenth embodiment, the third electronic component 3 is a circuit element.

Figure 20:
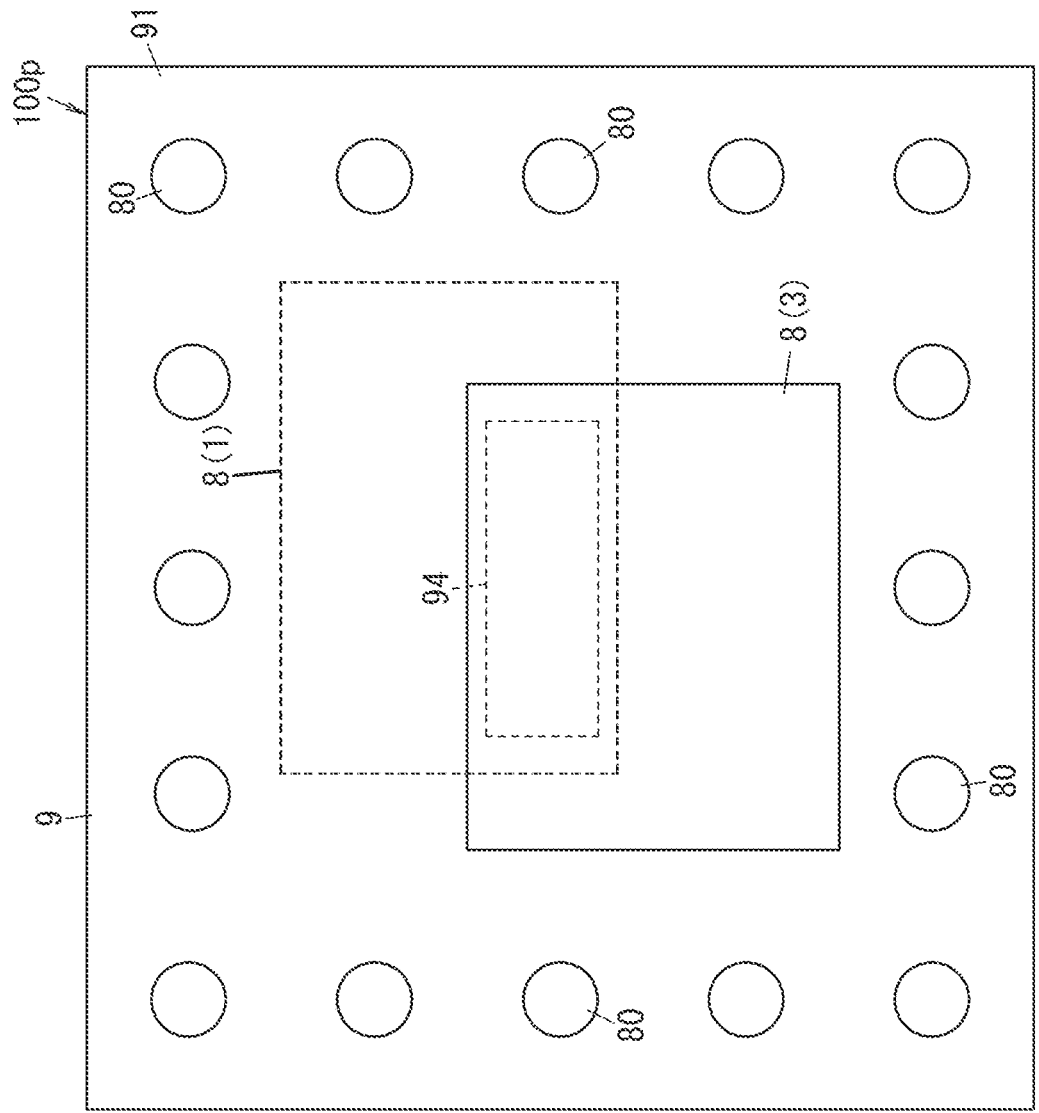
FIG. 20 is a plan view of the high frequency module.

In the high frequency module 100p according to the tenth embodiment, as illustrated in FIG. 20, at least part of the first electronic component 1, at least part of the third electronic component 3, and the inner-layer inductor 94 overlap with one another in the thickness direction D1 of the mounting substrate 9. Thus, stray capacitance generated between the inner-layer inductor 94 and the ground layer can be reduced, and power loss can thus be reduced.

In the high frequency module 100p according to the tenth embodiment, the entire second main surface 802 of the third electronic component 3 are exposed. However, only part of the second main surface 802 may be exposed.

(Modification of Tenth Embodiment)

Figure 21:
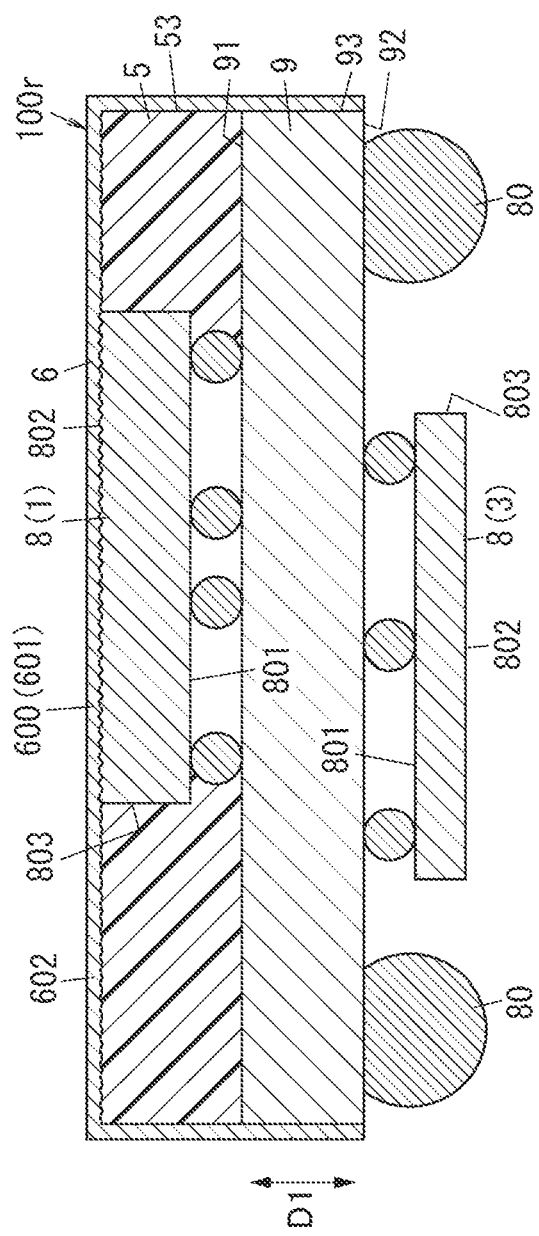
FIG. 21 is a cross-section view of a high frequency module according to a modification of the tenth embodiment.

A high frequency module 100r according to a modification of the tenth embodiment will be described with reference to FIG. 21. Component elements of the high frequency module 100r according to the modification of the tenth embodiment similar to those of the high frequency module 100p according to the tenth embodiment will be denoted by the same signs and description for those component elements will be omitted.

The high frequency module 100r according to the modification of the tenth embodiment is different from the high frequency module 100p according to the tenth embodiment in that the plurality of external connection terminals 80 are ball bumps. Furthermore, the high frequency module 100r according to the modification of the tenth embodiment is different from the high frequency module 100p according to the tenth embodiment in that the high frequency module 100r does not include the resin layer 7 of the high frequency module 100p according to the tenth embodiment.

A ball bump configuring each of the plurality of external connection terminals 80 is made of, for example, gold, copper, or solder.

Some of the plurality of external connection terminals 80 may be ball bumps, and other external connection terminals 80 may be columnar electrodes.

In the high frequency module 100r according to the modification of the tenth embodiment, the shield layer 6 is in contact with the second main surface 12 of the first substrate 10 (see FIG. 3) as in the high frequency module 100p according to the tenth embodiment. Thus, in the high frequency module 100r according to the modification of the tenth embodiment, heat dissipating characteristics of the acoustic wave filter 1 can be improved as in the high frequency module 100p according to the tenth embodiment. In the high frequency module 100r according to the modification of the tenth embodiment, the third electronic component 3 is a circuit element.

(Eleventh Embodiment)

Figure 22:
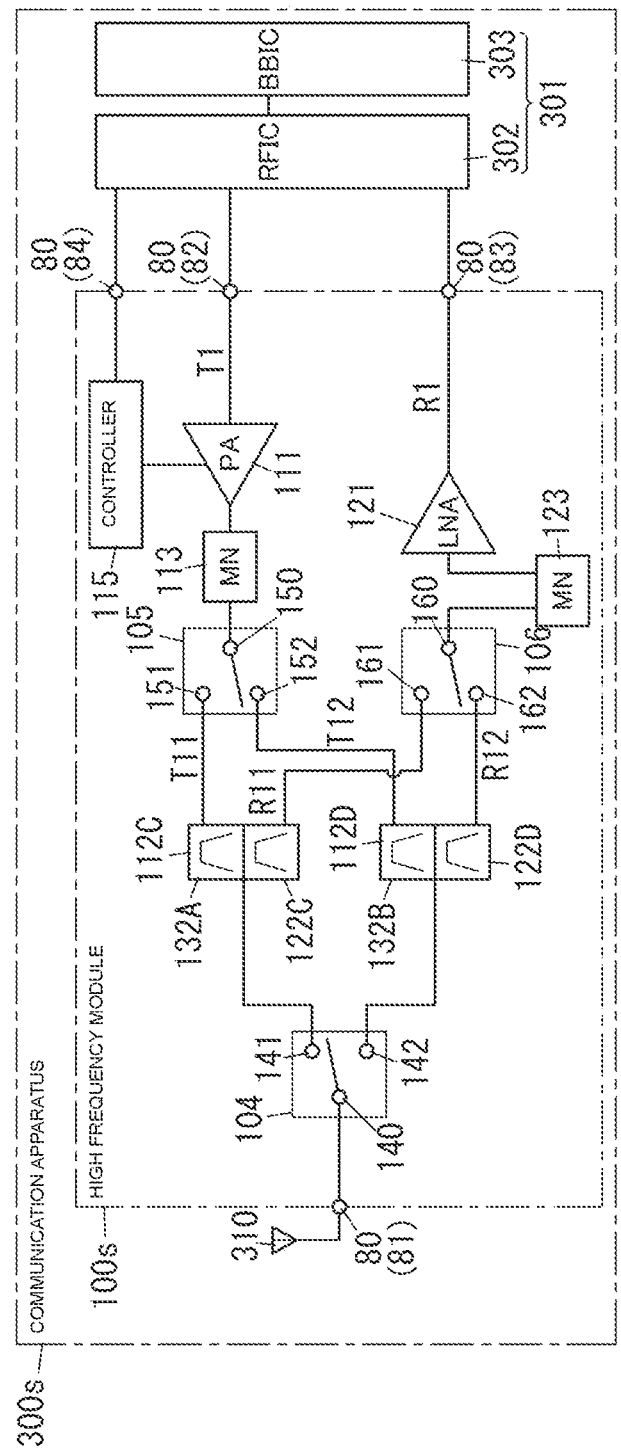
FIG. 22 is a circuit configuration diagram of a communication apparatus including a high frequency module according to an eleventh embodiment.
Figure 23:
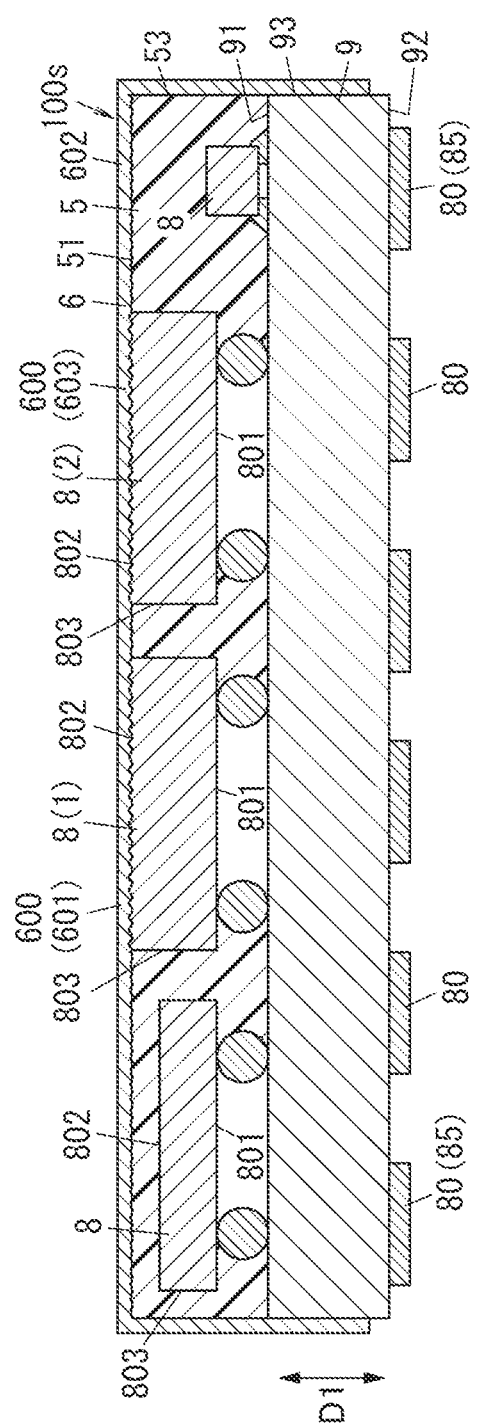
FIG. 23 is a cross-section view of the high frequency module.

A high frequency module 100s and a communication apparatus 300s according to an eleventh embodiment will be described with reference to FIGS. 22 and 23. Component elements of the high frequency module 100s and the communication apparatus 300s according to the eleventh embodiment similar to those of the high frequency module 100 and the communication apparatus 300 according to the first embodiment will be denoted by the same signs and description for those component elements will be omitted.

The high frequency module 100s according to the eleventh embodiment is different from the high frequency module 100 according to the first embodiment in that a transmission filter 112C and a reception filter 122C are a transmission filter and a reception filter that configure a duplexer 132A and a transmission filter 112D and a reception filter 122D are a transmission filter and a reception filter that configure a duplexer 132B.

The communication apparatus 300s according to the eleventh embodiment includes the high frequency module 100s, in place of the high frequency module 100 described above. Furthermore, the communication apparatus 300s according to the eleventh embodiment further includes the signal processing circuit 301 and the antenna 310.

In the high frequency module 100s according to the eleventh embodiment, the first electronic component 1 and the second electronic component 2 are acoustic wave filters (hereinafter, may also be referred to as "acoustic wave filters 1 and 2"). The acoustic wave filter 1 is, for example, the transmission filter 112C provided on the signal path T1 (see FIG. 22) for transmission signals. The acoustic wave filter 2 is, for example, the reception filter 122C provided on the signal path R1 (see FIG. 22) for reception signals. That is, the first electronic component 1 is the transmission filter 112C of the duplexer 132A, in which the distance between the transmission band and the reception band is shortest, among the duplexers 132A and 132B. Furthermore, the second electronic component 2 is the reception filter 122C of the duplexer 132A, in which the distance between the transmission band and the reception band is shortest, among the duplexers 132A and 132B.

Each of the first electronic component 1 and the second electronic component 2 includes, for example, a substrate having a first main surface and a second main surface that face each other and a circuit unit formed near the first main surface of the substrate. The substrate is a piezoelectric substrate. The piezoelectric substrate is, for example, a lithium niobate substrate. The circuit unit includes a plurality of IDT electrodes that are associated with a plurality of series-arm resonators in a one-to-one relationship and a plurality of IDT electrodes that are associated with a plurality of parallel-arm resonators in a one-to-one relationship.

Each of the first electronic component 1 and the second electronic component 2 is flip-chip mounted on the first main surface 91 of the mounting substrate 9 in such a manner that the first main surface, out of the first main surface and the second main surface, of the substrate is near the mounting substrate 9. In the high frequency module 100s according to the eleventh embodiment, the second main surface 802 of each of the first electronic component 1 and the second electronic component 2 that is far from the mounting substrate 9 is in contact with the shield layer 6. Thus, heat generated at the first electronic component 1 and the second electronic component 2 can be transmitted to the shield layer 6 through the second main surface 802. Therefore, heat propagated from the first electronic component 1 to the second electronic component 2 can also be transmitted to the shield layer 6 through the second main surface 802 of the second electronic component 2, and degradation of the characteristics of the reception filter 122C configured as the second electronic component 2 can be reduced. Furthermore, temperature characteristics of the first electronic component 1 and the second electronic component 2 can also be improved. Thus, degradation of characteristics such as isolation between the transmission filter 112C configured as the first electronic component 1 and the reception filter 122C configured as the second electronic component 2 can also be reduced.

In the high frequency module 100s according to the eleventh embodiment, the piezoelectric substrate configuring each of the first electronic component 1 and the second electronic component 2 is a lithium niobate substrate. However, at least one of the piezoelectric substrate configuring the first electronic component 1 and the piezoelectric substrate configuring the second electronic component 2 may be, for example, a lithium tantalate substrate or a crystal substrate.

(Twelfth Embodiment)

Figure 24:
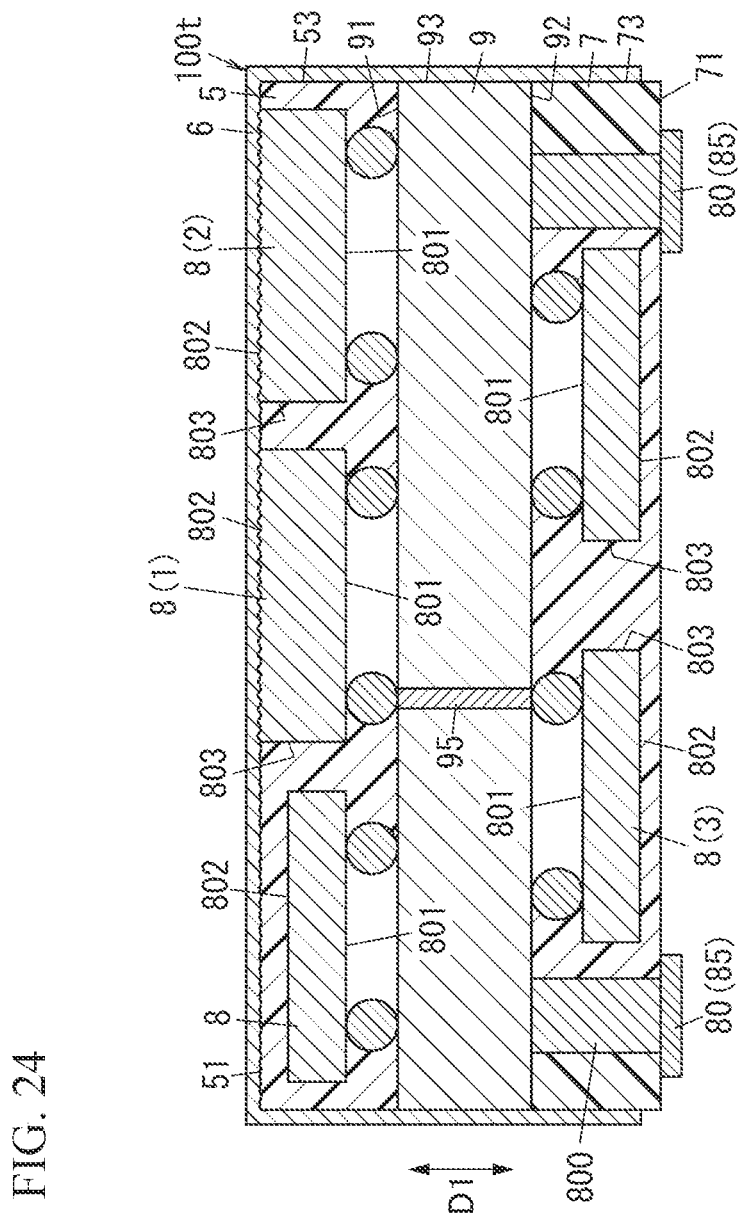
FIG. 24 is a cross-section view of a high frequency module according to a twelfth embodiment.

A high frequency module 100t according to a twelfth embodiment will be described with reference to FIG. 24. Component elements of the high frequency module 100t according to the twelfth embodiment similar to those of the high frequency module 100s according to the eleventh embodiment will be denoted by the same signs and description for those component elements will be omitted. The circuit configuration of the high frequency module 100t is similar to the circuit configuration of the high frequency module 100s according to the eleventh embodiment described above with reference to FIG. 22.

In the high frequency module 100t according to the twelfth embodiment, the plurality of electronic components 8 include the first electronic component 1, the second electronic component 2, and the third electronic component 3. The first electronic component 1, the second electronic component 2, and the third electronic component 3 are acoustic wave filters (hereinafter, may also be referred to as "acoustic wave filters 1, 2, and 3"). The acoustic wave filter 1 is, for example, the transmission filter 112C provided on the signal path T1 (see FIG. 22) for transmission signals. The acoustic wave filter 3 is, for example, the reception filter 122C provided on the signal path R1 (see FIG. 22) for reception signals. That is, the first electronic component 1 is the transmission filter 112C of the duplexer 132A, in which the distance between the transmission band and the reception band is shortest, among the duplexers 132A and 132B. The third electronic component 3 is the reception filter 122C of the duplexer 132A, in which the distance between the transmission band and the reception band is shortest, among the duplexers 132A and 132B. Furthermore, the acoustic wave filter 2 is, for example, the transmission filter 112D provided on the signal path T1 (see FIG. 22) for transmission signals.

Each of the first electronic component 1, the second electronic component 2, and the third electronic component 3 includes, for example, a substrate having a first main surface and a second main surface that face each other and a circuit unit formed near the first main surface of the substrate. The substrate is a piezoelectric substrate. The piezoelectric substrate of each of the first electronic component 1 and the second electronic component 2 is, for example, a lithium tantalate substrate. The piezoelectric substrate of the third electronic component 3 is, for example, a lithium niobate substrate. The circuit unit includes a plurality of IDT electrodes that are associated with a plurality of series-arm resonators in a one-to-one relationship and a plurality of IDT electrodes that are associated with a plurality of parallel-arm resonators in a one-to-one relationship.

Each of the first electronic component 1 and the second electronic component 2 is flip-chip mounted on the first main surface 91 of the mounting substrate 9 in such a manner that the first main surface, out of the first main surface and the second main surface, of the substrate is near the mounting substrate 9. The third electronic component 3 is flip-chip mounted on the second main surface 92 of the mounting substrate 9 in such a manner that the first main surface, out of the first main surface and the second main surface, of the substrate is near the mounting substrate 9. That is, the first electronic component 1 and the second electronic component 2 are arranged on the first main surface 91 of the mounting substrate 9, and the third electronic component 3 is arranged on the second main surface 92 of the mounting substrate 9. In the high frequency module 100t according to the twelfth embodiment, the plurality of electronic components 8 are mounted on both the first main surface 91 and the second main surface 92 of the mounting substrate 9. In the high frequency module 100t according to the twelfth embodiment, the third electronic component 3 is a circuit element.

In the high frequency module 100t according to the twelfth embodiment, a through electrode 95 that penetrates through the mounting substrate 9 in the thickness direction D1 of the mounting substrate 9 allows connection between the first electronic component 1 positioned on the first main surface 91 of the mounting substrate 9 and the third electronic component 3 positioned on the second main surface 92 of the mounting substrate 9. The through electrode 95 is, for example, a TSV (through silicon via). An electrical insulating part is interposed between the through electrode 95 and the mounting substrate 9. The electrical insulating part is made of, for example, silicon oxide. The through electrode 95 has, for example, a column shape.

In the high frequency module 100t according to the twelfth embodiment, part of the first electronic component 1 and part of the third electronic component 3 overlap with the through electrode 95 when viewed in plan from the thickness direction D1 of the mounting substrate 9.

In the high frequency module 100t according to the twelfth embodiment, the second main surfaces 802 of the first electronic component 1 and the second electronic component 2 that are arranged on the first main surface 91 of the mounting substrate 9 are in contact with the shield layer 6. That is, in the high frequency module 100*t* according to the twelfth embodiment, the second main surface 802 of the first electronic component 1 whose piezoelectric substrate is a lithium tantalate substrate is in contact with the shield layer 6. Thus, temperature characteristics of the duplexer 132A including the transmission filter 112C configured as the first electronic component 1 and the reception filter 122C configured as the third electronic component 3 can be improved. Furthermore, the transmission filter 112C and the reception filter 122C configuring the duplexer 132A are arranged on the first main surface 91 and the second main surface 92, respectively, of the mounting substrate 9, and the transmission filter 112C and the reception filter 122C are arranged to overlap with each other in the thickness direction D1 of the mounting substrate 9. Thus, the length of a connection part (through electrode 95) between the transmission filter 112C and the reception filter 122C is shortened, and a parasitic component can thus be reduced.

(Other Modifications)

The first to twelfth embodiments and the like described above are merely embodiments of the present disclosure. Various changes may be made to the first to twelfth embodiments and the like in accordance with designs of the present disclosure can be attained.

Although a BAW filter configuring the first electronic component 1 described above includes an element of a package structure, the BAW filter does not necessarily include an element of a package structure and may be a bare-chip BAW filter. Furthermore, in the case where the first BAW resonator 180 of the BAW filter is an FBAR, the first BAW resonator 180 does not necessarily have the structure illustrated in FIG. 7. For example, in the first BAW resonator 180, part of the electrical insulating film 185 may be formed in such a manner that a cavity is formed between the part of the electrical insulating film 185 and the first main surface 11 of the first substrate 10, instead of the cavity 184 formed in the first substrate 10. In this case, the first electrode 181 may be formed far from the cavity in the electrical insulating film 185, the piezoelectric film 182 may be formed on the first electrode 181, and the second electrode 183 may be formed on the piezoelectric film 182. The cavity between part of the electrical insulating film 185 and the first main surface 11 of the first substrate 10 may be formed by using, for example, a sacrificial layer etching technique.

Furthermore, filters such as the transmission filters 112A and 112B and the reception filters 122A and 122B are not necessarily ladder filters and may be, for example, longitudinally-coupled-resonator-type surface acoustic wave filters.

Furthermore, although the acoustic wave filters described above are acoustic wave filters using surface acoustic waves or bulk acoustic waves, the acoustic wave filters do not necessarily use surface acoustic waves or bulk acoustic waves and may use, for example, acoustic boundary waves, plate waves, or the like.

Although the plurality of first bumps 101 and 201 and the plurality of second bumps 202 are, for example, solder bumps, these bumps are not necessarily solder bumps and may be, for example, gold bumps.

Out of the plurality of electronic components 8, electronic components 8 other than the first electronic component 1 and the second electronic component 2 are not necessarily electrically connected to the mounting substrate 9 with bumps interposed therebetween and may be, for example, electrically connected to the mounting substrate 9 with bonding wire interposed therebetween.

The circuit configurations of the high frequency modules 100 to 100*t* are not limited to the examples described above. Furthermore, each of the high frequency modules 100 to 100*t* may include, as a circuit configuration, for example, a high frequency front end circuit supporting MIMO (Multi Input Multi Output).

Furthermore, the communication apparatus 300 according to the first embodiment may include any one of the high frequency modules 100*a* to 100*r*, in place of the high frequency module 100. Furthermore, the communication apparatus 300*s* according to the eleventh embodiment may include the high frequency module 100*t*, in place of the high frequency module 100*s*.

Although the first electronic component 1 described above is the transmission filter 112A provided on the signal path T1 for transmission signals, the first electronic component 1 is not necessarily the transmission filter 112A and may be, for example, a transmission and reception filter. The transmission and reception filter is provided on the signal path T1 for transmission signals. Furthermore, the transmission and reception filter is provided on the signal path R1 for reception signals. The transmission and reception filter is connected to a power amplifier with a switch interposed therebetween on the signal path T1, so that a transmission signal amplified by the power amplifier passes through the transmission and reception filter. Furthermore, the transmission and reception filter is connected to a low noise amplifier with the above-mentioned switch interposed therebetween on the signal path R1, so that a reception signal that has passed though the transmission and reception filter is output to the low noise amplifier. The transmission and reception filter is, for example, a TDD filter.

(Aspects)

Aspects described below are disclosed herein.

According to a first aspect, a high frequency module (100; 100*a* to 100*t*) includes a mounting substrate (9); an acoustic wave filter (1), a resin layer (5), and a shield layer (6). The mounting substrate (9) has a first main surface (91) and a second main surface (92) that face each other. The acoustic wave filter (1) is arranged near the first main surface (91) of the mounting substrate (9). The resin layer (5) is arranged on the first main surface (91) of the mounting substrate (9) and covers an outer peripheral surface (803) of the acoustic wave filter (1). The shield layer (6) covers the resin layer (5) and the acoustic wave filter (1). The shield layer (6) is in contact with a main surface (802) of the acoustic wave filter (1) that is far from the mounting substrate (9).

According to this aspect, heat dissipating characteristics of the acoustic wave filter (1) can be improved.

According to a second aspect, in the high frequency module (100; 100*a*; 100*b*) according to the first aspect, the acoustic wave filter (1) includes a piezoelectric substrate (10). The main surface (802) of the acoustic wave filter (1) is a main surface (12) of the piezoelectric substrate (10) that is far from the mounting substrate (9).

According to this aspect, an increase of temperature of the acoustic wave filter (1) can be reduced, and stable characteristics can be achieved.

According to a third aspect, in the high frequency module (100*e*) according to the first aspect, the acoustic wave filter (1) includes a piezoelectric layer (194), an IDT electrode (15), and a high acoustic velocity member (the first substrate 10 and a low acoustic velocity film 193). The IDT electrode (15) is arranged on the piezoelectric layer (194). The high acoustic velocity member is arranged opposite the IDT electrode (15) with the piezoelectric layer (194) interposed therebetween. An acoustic velocity of a bulk wave propagating in the high acoustic velocity member is higher than an acoustic velocity of an acoustic wave propagating in the piezoelectric layer (194). The high acoustic velocity member includes the supporting substrate (10) made of a silicon substrate. The main surface (802) of the acoustic wave filter (1) is the main surface (12) of the supporting substrate (10) that is far from the mounting substrate (9).

According to this aspect, filter characteristics of the acoustic wave filter (1) can be improved.

According to a fourth aspect, in the high frequency module (100c; 100d) according to the first aspect, the acoustic wave filter (1) includes the supporting substrate (10) made of a silicon substrate. The main surface (802) of the acoustic wave filter (1) is the main surface (12) of the supporting substrate (10) that is far from the mounting substrate (9).

According to this aspect, filter characteristics of the acoustic wave filter (1) can be improved.

According to a fifth aspect, in the high frequency module (100; 100a to 100t) according to any one of the first to fourth aspects, the acoustic wave filter (1) is a transmission filter (112A) or a transmission and reception filter that is provided on a signal path (T1) for a transmission signal.

According to this aspect, heat dissipating characteristics of the transmission filter (112A) or the transmission and reception filter can be improved.

According to a sixth aspect, in the high frequency module (100g) according to any one of the first to fifth aspects, the shield layer (6) includes a first contact part (61) and a second contact part (62). The first contact part (61) is a part that is in contact with the main surface (802) of the acoustic wave filter (1). The second contact part (62) is a part that is in contact with the outer peripheral surface (803) of the acoustic wave filter (1) along a thickness direction (D1) of the mounting substrate (9).

According to this aspect, heat dissipating characteristics of the acoustic wave filter (1) can further be improved.

According to a seventh aspect, the high frequency module (100i; 100j) according to any one of the first to sixth aspects further includes a high frequency element (2). The high frequency element (2) is arranged on the first main surface (91) of the mounting substrate (9). The acoustic wave filter (1) is arranged on the main surface (802) of the high frequency element (2) that is far from the mounting substrate (9).

According to this aspect, heat dissipating characteristics of the acoustic wave filter (1) can be improved while the area of the first main surface (91) of the mounting substrate (9) being reduced.

According to an eighth aspect, in the high frequency module (100i; 100j) according to the seventh aspect, the acoustic wave filter (1) is the transmission filter (112A) that is provided on the signal path (T1) for a transmission signal. The high frequency element (2) is the reception filter (122A) that is provided on a signal path (R1) for a reception signal.

According to this aspect, heat dissipating characteristics of the acoustic wave filter (1) can be improved while the area of the first main surface (91) of the mounting substrate (9) being reduced.

According to a ninth aspect, the high frequency module (100h) according to any one of the first to eighth aspects further includes a second element (2). The second element (2) is arranged on the first main surface (91) of the mounting substrate (9). The main surface (801) of the acoustic wave filter (1) that is near the mounting substrate (9) is farther away from the mounting substrate (9) than the main surface (801) of the second element (2) that is near the mounting substrate (9) is.

According to this aspect, heat dissipating characteristics of the acoustic wave filter (1) can be improved.

According to a tenth aspect, the high frequency module (100; 100a to 100t) according to any one of the first to ninth aspects further includes a second electronic component (8). The second electronic component (8) is arranged on the first main surface (91) of the mounting substrate (9) and is covered with the resin layer (5). A maximum height roughness of the main surface (802) of the acoustic wave filter (1) is greater than a maximum height roughness of the main surface (802) of the second electronic component (8), which is covered with the resin layer (5), the main surface (802) of the second electronic component (8) being far from the mounting substrate (9).

According to this aspect, adhesiveness between the acoustic wave filter (1) and the shield layer (6) can be improved.

According to an eleventh aspect, in the high frequency module (100; 100a to 100t) according to any one of the first to ninth aspects, the shield layer (6) includes an identification mark (600). The identification mark (600) is a part of the shield layer (6) that overlaps with the acoustic wave filter (1) in the thickness direction (D1) of the mounting substrate (9).

According to this aspect, a person is able to visually recognize the identification mark (600).

According to a twelfth aspect, in the high frequency module (100f; 100j) according to any one of the first to eleventh aspects, the main surface (802) of the acoustic wave filter (1) protrudes toward the shield (6) relative to a main surface (51) of the resin layer (5) that is far from the mounting substrate (9).

According to this aspect, heat dissipating characteristics of the acoustic wave filter (1) can further be improved.

According to a thirteenth aspect, the high frequency module (100m) according to any one of the first to twelfth aspects further includes an electronic component (2). The electronic component (2) is arranged on the first main surface (91) of the mounting substrate (9). The shield layer (6) is in contact with the main surface (802) of the electronic component (2) that is far from the mounting substrate (9).

According to this aspect, heat dissipating characteristics of the acoustic wave filter (1) and the electronic component (2) can be improved.

According to a fourteenth aspect, the high frequency module (100s) according to any one of the first to thirteenth aspects includes a transmission filter (112C) and a reception filter (122C) that configure a duplexer (132A) as the acoustic wave filter (1). The shield layer (6) is in contact with the main surface (802) of each of the transmission filter (112C) and the reception filter (122C) that is far from the mounting substrate (9).

According to this aspect, heat dissipating characteristics of the transmission filter (112C) and the reception filter (122C) can be improved.

According to a fifteenth aspect, the high frequency module (100n; 100p; 100r; 100t) according to any one of the first to fourteenth aspects further includes a circuit element (3). The circuit element (3) is arranged on the second main surface (92) of the mounting substrate (9).

According to this aspect, size reduction when viewed from the thickness direction (D1) of the mounting substrate (9) can be achieved.

According to a sixteenth aspect, in the high frequency module (100n; 100p; 100r) according to the fifteenth aspect, the main surface (802) of the circuit element (3) that is far from the mounting substrate (9) is exposed.

According to this aspect, size reduction when viewed from the thickness direction (D1) of the mounting substrate (9) can be achieved.

According to a seventeenth aspect, the high frequency module (100; 100a to 100t) according to any one of the first to sixteenth aspects further includes an external connection terminal (80). The external connection terminal (80) is arranged on the second main surface (92) of the mounting substrate (9).

According to this aspect, heat dissipating characteristics of the acoustic wave filter (1) can be improved.

According to an eighteenth aspect, a communication apparatus (300; 300s) includes the high frequency module (100; 100a to 100t) according to any one of the first to seventeenth aspects and a signal processing circuit (301). The signal processing circuit (301) is connected to the high frequency module (100; 100a to 100t) and performs signal processing for a high frequency signal.

According to this aspect, heat dissipating characteristics of the acoustic wave filter (1) can be improved.

REFERENCE SIGNS LIST

100, 100a, 100b, 100c, 100d, 100e, 100f, 100g, 100h, 100i, 100j, 100k, 100m, 100n, 100p, 100r, 100s, 100t high frequency module
1 first electronic component (acoustic wave filter)
10 first substrate (piezoelectric substrate, supporting substrate)
11 first main surface
12 second main surface
13 outer peripheral surface
14 first circuit unit
15 IDT electrode
16 first pad electrode
17 first spacer layer
18 first cover member
19 first terminal
193 low acoustic velocity film
194 piezoelectric layer
195 insulating layer
2 second electronic component (high frequency element, second element, electronic component)
3 third electronic component (circuit element)
5 resin layer
51 main surface
53 outer peripheral surface
6 shield layer
61 first contact part
62 second contact part
600 identification mark
601 first part
602 second part
603 third part
7 resin layer
71 main surface
8 electronic component
801 first main surface
802 second main surface
803 outer peripheral surface
9 mounting substrate
91 first main surface
92 second main surface
93 outer peripheral surface
80 external connection terminal
81 antenna terminal
82 signal input terminal
83 signal output terminal
85 ground terminal
101 first bump
104 first switch
140 common terminal
141, 142 selection terminal
105 second switch
150 common terminal
151, 152 selection terminal
106 third switch
160 common terminal
161, 162 selection terminal
111 power amplifier
112A, 112B, 112C, 112D transmission filter
113 output matching circuit
115 controller
121 low noise amplifier
122A, 122B, 122C, 122D reception filter
123 input matching circuit
132A, 132B duplexer
171 first filter chip
173 first package substrate
1730 first supporting body
1731 first main surface
1732 second main surface
1733 electrode
1734 external connection electrode
1735 through electrode
174 bump
175 first sealing resin unit
180 first BAW resonator
181 first electrode
182 piezoelectric film
183 second electrode
184 cavity
185 electrical insulating film
201 first bump
202 second bump
300, 300s communication apparatus
301 signal processing circuit
302 RF signal processing circuit
303 baseband signal processing circuit
310 antenna
A1 acoustic reflector layer
A11 low acoustic impedance layer
A12 high acoustic impedance layer
D1 thickness direction
S1 first space
SP1 first space

The invention claimed is:
1. A high frequency module comprising:
a mounting substrate that has a first main surface and a second main surface facing each other;
an acoustic wave filter that is physically arranged closer to the first main surface of the mounting substrate than to the second main surface;
a resin layer that is physically arranged on the first main surface of the mounting substrate and that covers an outer peripheral surface of the acoustic wave filter; and
a shield layer that covers the resin layer and the acoustic wave filter,
wherein the shield layer is in contact with a first main surface of the acoustic wave filter that is farther from the mounting substrate than a second main surface, the first and second main surfaces of acoustic wave filter facing each other.

2. The high frequency module according to claim 1, wherein the acoustic wave filter comprises a piezoelectric substrate, and
wherein the first main surface of the acoustic wave filter is a first main surface of the piezoelectric substrate that is farther from the mounting substrate than a second main surface of the piezoelectric substrate, the first and second main surfaces of the piezoelectric substrate facing each other.

3. The high frequency module according to claim 1, wherein the acoustic wave filter comprises:
   a piezoelectric layer,
   an interdigital transducer (IDT) electrode that is physically arranged on the piezoelectric layer, and
   a high acoustic velocity element that is physically arranged opposite the IDT electrode with the piezoelectric layer interposed therebetween, an acoustic velocity of a bulk wave propagating in the high acoustic velocity element being greater than an acoustic velocity of an acoustic wave propagating in the piezoelectric layer,
wherein the high acoustic velocity element comprises a supporting substrate made of silicon, and
wherein the first main surface of the acoustic wave filter is a first main surface of the supporting substrate that is farther from the mounting substrate than a second main surface of the supporting substrate, the first and second main surfaces of the supporting substrate facing each other.

4. The high frequency module according to claim 1, wherein the acoustic wave filter comprises a supporting substrate made of silicon, and
wherein the first main surface of the acoustic wave filter is a first main surface of the supporting substrate that is farther from the mounting substrate than a second main surface of the supporting substrate, the first and second main surfaces of the supporting substrate facing each other.

5. The high frequency module according to claim 1, wherein the acoustic wave filter is a transmission filter or a transmission and reception filter that is in a signal path for a transmission signal.

6. The high frequency module according to claim 1, wherein the shield layer comprises:
   a first contact part that is in contact with the first main surface of the acoustic wave filter, and
   a second contact part that is in contact with an outer peripheral surface of the acoustic wave filter along a thickness direction of the mounting substrate.

7. The high frequency module according to claim 1, further comprising a high frequency element that is physically arranged on the first main surface of the mounting substrate,
wherein the acoustic wave filter is arranged on a first main surface of the high frequency element that is farther from the mounting substrate than a second main surface of the high frequency element, the first and second main surfaces of the high frequency element facing each other.

8. The high frequency module according to claim 7, wherein the acoustic wave filter is a transmission filter that is in a signal path for transmission signal, and
wherein the high frequency element is a reception filter that is in a signal path for a reception signal.

9. The high frequency module according to claim 1, further comprising a second element that is physically arranged on the first main surface of the mounting substrate,
wherein the second main surface of the acoustic wave filter that is closer to the mounting substrate than the first main surface is farther from the mounting substrate than a second main surface of the second element that is closer the mounting substrate than a first main surface of the second element, the first and second main surfaces of the second element facing each other.

10. The high frequency module according to claim 1, further comprising a second electronic component that is physically arranged on the first main surface of the mounting substrate and that is covered with the resin layer,
wherein a maximum height roughness of the main surface of the acoustic wave filter is greater than a maximum height roughness of a first main surface of the second electronic component covered with the resin layer, the first main surface of the second electronic component being farther from the mounting substrate than a second main surface of the second electronic component substrate, the first and second main surfaces of the second electronic component facing each other.

11. The high frequency module according to claim 1, wherein the shield layer comprises an identification mark that overlaps with the acoustic wave filter in a thickness direction of the mounting substrate.

12. The high frequency module according to claim 1, wherein the main surface of the acoustic wave filter protrudes toward the shield relative to a first main surface of the resin layer that is farther from the mounting substrate than a second main surface of the resin layer, the first and second main surfaces of the resin layer facing each other.

13. The high frequency module according to claim 1, further comprising an electronic component that is physically arranged on the first main surface of the mounting substrate,
wherein the shield layer is in contact with a first main surface of the electronic component that is farther from the mounting substrate than a second main surface of the electronic component, the first and second main surfaces of the electronic component facing each other.

14. The high frequency module according to claim 1, wherein the acoustic wave filter is a duplexer a transmission filter and a reception filter,
wherein the shield layer is in contact with a first main surface of each of the transmission filter and the reception filter that is farther from the mounting substrate than a second main surface of each the transmission filter and the reception filter, the first and second main surfaces of the transmission and reception filters facing each other.

15. The high frequency module according to claim 1, further comprising a circuit element that is physically arranged on the second main surface of the mounting substrate.

16. The high frequency module according to claim 15, wherein a first main surface of the circuit element that is farther from the mounting substrate than a second main surface of the circuit element is exposed, the first and second main surfaces of the circuit element facing each other.

17. The high frequency module according to claim 1, further comprising an external connection terminal that is physically arranged on the second main surface of the mounting substrate.

18. A communication apparatus comprising:
   the high frequency module according to claim 1; and a signal processing circuit that is connected to the high frequency module and that is configured to perform signal processing for a high frequency signal.

\* \* \* \* \*